US011420505B1

(12) United States Patent
Wolf et al.

(10) Patent No.: US 11,420,505 B1
(45) Date of Patent: Aug. 23, 2022

(54) DOOR AND ROOF CONFIGURATIONS FOR VEHICLES

(71) Applicants: Philipp J. Wolf, Santa Clara, CA (US); James J. Dowle, Mountain View, CA (US); Jeffrey M. Riepling, Clayton, CA (US)

(72) Inventors: Philipp J. Wolf, Santa Clara, CA (US); James J. Dowle, Mountain View, CA (US); Jeffrey M. Riepling, Clayton, CA (US)

(73) Assignee: Apple Inc., Cupertino, CA (US)

( * ) Notice: Subject to any disclaimer, the term of this patent is extended or adjusted under 35 U.S.C. 154(b) by 65 days.

(21) Appl. No.: 16/800,293

(22) Filed: Feb. 25, 2020

Related U.S. Application Data

(60) Provisional application No. 62/821,464, filed on Mar. 21, 2019.

(51) Int. Cl.
| | |
|---|---|
| *B60J 5/06* | (2006.01) |
| *B60J 7/047* | (2006.01) |
| *B60J 7/00* | (2006.01) |
| *B60J 7/02* | (2006.01) |
| *B60J 1/16* | (2006.01) |
| *B60N 2/005* | (2006.01) |
| *B62D 25/04* | (2006.01) |

(52) U.S. Cl.
CPC . *B60J 5/06* (2013.01); *B60J 1/16* (2013.01); *B60J 7/047* (2013.01); *B60J 5/062* (2013.01); *B60J 7/0038* (2013.01); *B60J 7/02* (2013.01); *B60N 2/005* (2013.01); *B62D 25/04* (2013.01)

(58) Field of Classification Search
CPC ....... B60J 5/06; B60J 5/062; B60J 1/16; B60J 7/0038; B60J 7/02; B60J 7/041; B60J 7/047; B60J 7/1642
USPC ........ 296/99.1, 100.06, 210, 220.01, 216.01, 296/216.02, 216.03, 216.04, 216.05; 49/36, 40, 41, 103, 104, 118
See application file for complete search history.

(56) References Cited

U.S. PATENT DOCUMENTS

| | | | |
|---|---|---|---|
| 1,826,440 A * | 10/1931 | Tarbox ................. | B62D 25/082 296/202 |
| 2,857,198 A | 10/1958 | Himka et al. | |
| 4,415,195 A | 11/1983 | Furukawa et al. | |
| 4,852,938 A | 8/1989 | Hirshberg et al. | |

(Continued)

FOREIGN PATENT DOCUMENTS

| | | |
|---|---|---|
| CN | 101844503 A | 9/2010 |
| CN | 202764668 U | 3/2013 |

(Continued)

*Primary Examiner* — Dennis H Pedder
*Assistant Examiner* — Joyce Eileen Hill
(74) *Attorney, Agent, or Firm* — Young Basile Hanlon & MacFarlane, P.C.

(57) ABSTRACT

A vehicle includes a vehicle body, a first panel assembly that is movable between a closed position and an open position with respect to a first opening of the vehicle body, a second panel assembly that is movable between a closed position and an open position with respect to a second opening of the vehicle body, a front seat that faces rearward and is accessible from the first opening and the second opening, and a rear seat that faces forward and is accessible from the first opening and the second opening.

20 Claims, 23 Drawing Sheets

(56) References Cited

U.S. PATENT DOCUMENTS

| | | | |
|---|---|---|---|
| 6,092,865 A * | 7/2000 | Jaekel | B62D 23/005 |
| | | | 296/205 |
| 10,179,504 B2 * | 1/2019 | Holroyd | B60J 7/1642 |
| 10,189,417 B1 | 1/2019 | Morken | |
| 10,220,686 B2 * | 3/2019 | Baccouche | B62D 25/04 |
| 10,300,954 B2 * | 5/2019 | Nusier | B62D 25/04 |
| 10,449,840 B2 * | 10/2019 | Ajisaka | B60J 5/047 |
| 2019/0135349 A1 * | 5/2019 | Nusier | B60J 5/06 |
| 2021/0309299 A1 * | 10/2021 | Hara | B62D 25/06 |

FOREIGN PATENT DOCUMENTS

| | | | | |
|---|---|---|---|---|
| EP | 0482563 A1 * | 4/1992 | | B62D 33/046 |
| EP | 2110277 B1 | 11/2014 | | |
| KR | 101148133 B1 | 5/2012 | | |
| WO | WO-2020164489 A1 * | 8/2020 | | B60J 7/1642 |

\* cited by examiner

DOOR AND ROOF CONFIGURATIONS FOR VEHICLES

CROSS-REFERENCE TO RELATED APPLICATIONS

This application claims the benefit of U.S. Provisional Application No. 62/821,464, filed on Mar. 21, 2019, the contents of which is hereby incorporated by reference in its entirety for all purposes.

TECHNICAL FIELD

The application relates generally to door and roof configurations for vehicles.

BACKGROUND

Automobiles include doors to allow passengers to enter and exit the automobile. Commonly, doors are mounted to automobile bodies for rotational motion around a pivot point or for sliding motion along a rail. Typical doors extend from a sill that is located at or near the elevation of a floor of the vehicle to a longitudinally extending rail that interconnects structural pillars near an elevation of a roof of the vehicle.

SUMMARY

One aspect of the disclosure is a vehicle that has a vehicle body. The vehicle body includes a front-left door pillar, a front-right door pillar, a rear-left door pillar, a rear-right door pillar, a front lateral beam that extends from the front-left door pillar to the front-right door pillar, a rear lateral beam that extends from the rear-left door pillar to the rear-right door pillar, a central longitudinal beam that extends from the front lateral beam to the rear lateral beam, a floor, a first opening that is bounded by the front-left door pillar, the rear-left door pillar, the central longitudinal beam and the floor, and a second opening that is bounded by the front-right door pillar, the rear-right door pillar, the central longitudinal beam and the floor. The vehicle also includes a first panel assembly that is movable between a closed position and an open position with respect to the first opening, a second panel assembly that is movable between a closed position and an open position with respect to the second opening, a front seat that faces rearward and is accessible from the first opening and the second opening, and a rear seat that faces forward and is accessible from the first opening and the second opening.

Another aspect of the disclosure is a vehicle that includes a vehicle body. The vehicle body includes a first opening, a second opening, and central longitudinal beam that is located between the first opening and the second opening. The vehicle also includes a first panel assembly that is movable between a closed position and an open position with respect to the first opening, wherein the first panel assembly includes a front-left door panel, a rear-left door panel, and a left roof panel, and the front-left door panel and the rear-left door panel slide longitudinally away from each other during movement from the closed position to the open position. The vehicle also includes a second panel assembly that is movable between a closed position and an open position with respect to the second opening, wherein the second panel assembly includes a front-right door panel, a rear-right door panel, and a right roof panel, and the front-right door panel and the rear-right door panel slide longitudinally away from each other during movement from the closed position to the open position.

Another aspect of the disclosure is a vehicle that includes a vehicle body. The vehicle body includes a floor, a first opening, a second opening, and a central longitudinal beam that is located between the first opening and the second opening. The vehicle also includes a front-left door and roof panel that is movable between a closed position and an open position with respect to the first opening by sliding laterally forward from the closed position to the open position, wherein the front-left door and roof panel extends from the floor to the central longitudinal beam in the closed position. The vehicle also includes a rear-left door and roof panel that is movable between a closed position and an open position with respect to the first opening by sliding laterally rearward from the closed position to the open position, wherein the front-left door and roof panel extends from the floor to the central longitudinal beam in the closed position, and the rear-left door and roof panel engages the front-left door and roof panel in the closed position. The vehicle also includes a front-right door and roof panel that is movable between a closed position and an open position with respect to the second opening by sliding laterally forward from the closed position to the open position, wherein the front-right door and roof panel extends from the floor to the central longitudinal beam in the closed position. The vehicle also includes a rear-right door and roof panel that is movable between a closed position and an open position with respect to the second opening by sliding laterally rearward from the closed position to the open position, wherein the front-right door and roof panel extends from the floor to the central longitudinal beam in the closed position, and the rear-right door and roof panel engages the front-right door and roof panel in the closed position.

DETAILED DESCRIPTION

The following disclosure relates generally to door and roof configurations for vehicles. Many conventional vehicles require passengers to transition to a seated position while simultaneously entering the passenger compartment of the vehicle. This can be a complicated motion that some passengers find difficult. The configurations described herein include door and roof panels that move to define wide door and roof openings to provide ample width and height for entering the vehicle in a natural body position.

Figure 1:
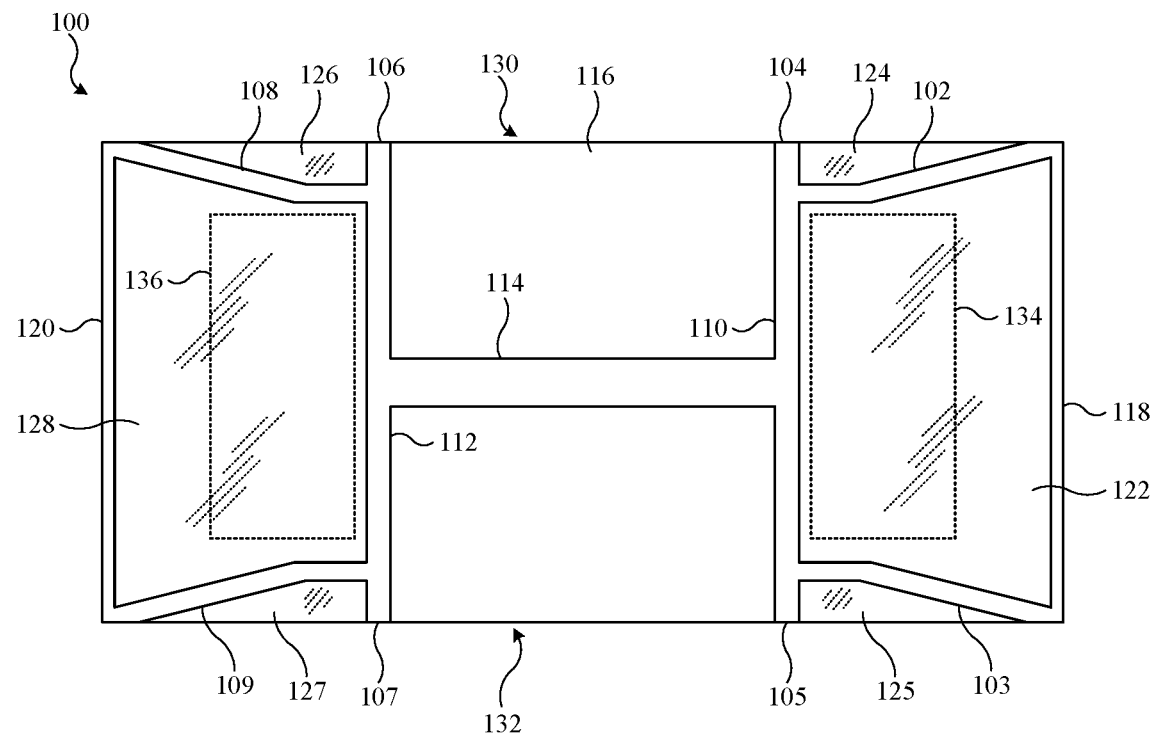
FIG. 1 is a top view of a vehicle body.
Figure 2:
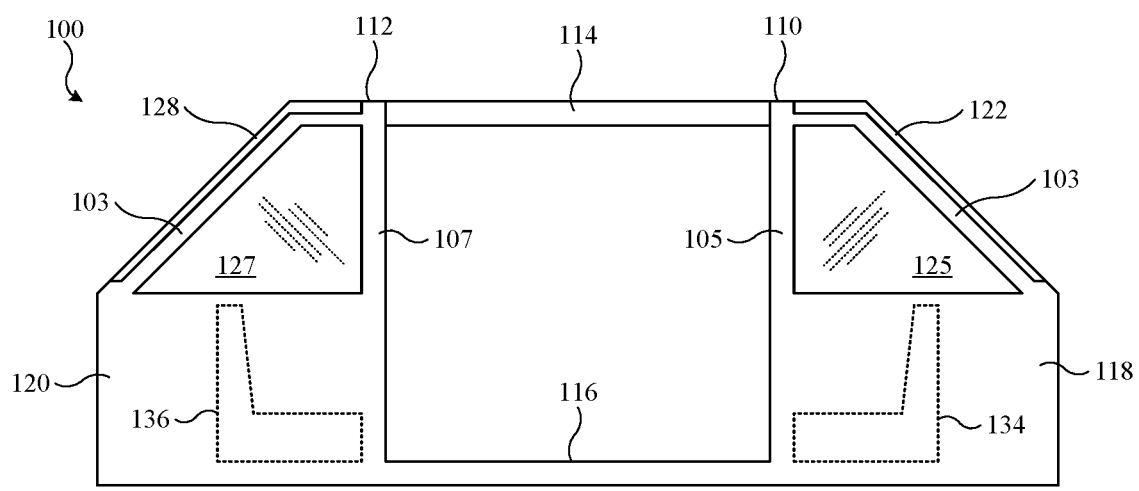
FIG. 2 is a side view of the vehicle body.
Figure 3:
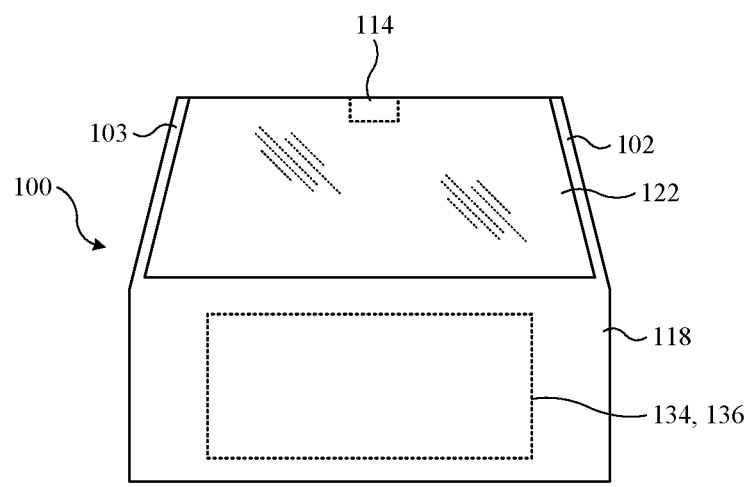
FIG. 3 is a front view of the vehicle body.

FIGS. 1-3 show a vehicle body 100, including a top view of the vehicle body 100 in FIG. 1, a side view of the vehicle body 100 in FIG. 2, and a front view of the vehicle body 100 in FIG. 3. The vehicle body 100 may be formed as a unitary structure or may include several individual structures that are connected to each other. Known vehicle architectures can be used to build the vehicle body 100, including a unibody architecture, a monocoque architecture, a body-on-frame architecture, or combinations of these and/or other vehicle architectures.

The vehicle body 100 extends in a longitudinal direction from a front end to a rear end. The vehicle body 100 includes a front-left window pillar 102, a front-right window pillar 103, a front-left door pillar 104, a front-right door pillar 105, a rear-left door pillar 106, a rear-right door pillar 107, rear-left window pillar 108, and a rear-right window pillar 109. A roof structure of the vehicle body 100 is defined by a front lateral beam 110, a rear lateral beam 112, and a central longitudinal beam 114. The vehicle body 100 also includes a floor 116, a front lower body portion 118 at the front end of the vehicle body 100, and a rear lower body portion 120 at the rear end of the vehicle body.

Windows may be connected to the vehicle body 100. The windows may be formed from conventional materials, such as transparent or translucent glass or plastic. In the illustrated example, a front window 122, a front-left window 124, a front-right window 125, a rear-left window 126, a rear-right window 127, and a rear window 128 are connected to the vehicle body 100. The front window may be referred to as a windshield. These and other windows may be fixed or movable. In some implementations, the number of windows may be varied, or some or all of the windows shown in the illustrated example may be omitted.

The front-left window pillar 102 and the front-right window pillar 103 are generally upright structural members that each extend from the front lower body portion 118 of the vehicle body 100 to a roof area of the vehicle body 100. The front-left window pillar 102 and the front-right window pillar 103 are located at left and right sides of the front window 122. The front-left window pillar 102 is located between the front window 122 and the front-left window 124. The front-right window pillar 103 is located between the front window 122 and the front-right window 125.

The rear-left window pillar 108 and the rear-right window pillar 109 are generally upright structural members that each extend from the rear lower body portion 120 of the vehicle body 100 to a roof area of the vehicle body 100. The rear-left window pillar 108 and the rear-right window pillar 109 are located at left and right sides of the rear window 128. The rear-left window pillar 108 is located between the rear window 128 and the rear-left window 126. The rear-right window pillar 109 is located between the rear window 128 and the rear-right window 127.

The front-left door pillar 104 and the rear-left door pillar 106 are generally upright structural members that, at their respective bottom ends, each extend upward from a location at or near the floor 116 of the vehicle body 100 to the roof area of the vehicle body 100. The front-left door pillar 104 is located adjacent to and rearward from the front-left window 124. The rear-left door pillar 106 is located adjacent to and forward from the rear-left window 126.

The front-right door pillar 105 and the rear-right door pillar 107 are generally upright structural members that, at their respective bottom ends, each extend upward from a location at or near the floor 116 of the vehicle body 100 to the roof area of the vehicle body 100. The front-right door pillar 105 is located adjacent to and rearward from the front-right window 125. The rear-right door pillar 107 is located adjacent to and forward from the rear-right window 127.

Top ends of the front-left door pillar 104 and the front-right door pillar 105 are connected to the front lateral beam 110. The front lateral beam 110 is a structural member that extends in a side-to-side direction of the vehicle body 100 between the left and right sides of the vehicle body 100. Top ends of the rear-left door pillar 106 and the rear-right door pillar 107 are connected to the rear lateral beam 112. The rear lateral beam 112 is a structural member that extends in a side-to-side direction of the vehicle body 100 between the left and right sides of the vehicle body 100.

The central longitudinal beam 114 is a structural member that extends from the front lateral beam 110 to the rear lateral beam 112. In the illustrated example, the central longitudinal beam 114 is centered relative to the lateral width of the vehicle body 100 and is laterally symmetrical relative to the lateral width of the vehicle body 100. In alternative implementations, the vehicle body 100 may include a longitudinal beam that is offset relative to the lateral width of the vehicle body 100 and/or non-symmetrical relative to the lateral width of the vehicle body 100. The lateral width of the central longitudinal beam 114 is significantly smaller than the lateral width of the vehicle body 100. As an example, the lateral width of the central longitudinal beam 114 may be between ten percent and fifty percent of the lateral width of the vehicle body 100.

The vehicle body 100 defines a first opening 130 and a second opening 132. The central longitudinal beam 114 is located between the first opening 130 and the second opening 132 such that the central longitudinal beam separates the first opening 130 from the second opening 132. The first opening 130 is located on the left side of the vehicle body 100. The second opening 132 is located on the right side of the vehicle body 100. In the illustrated example, the first opening 130 and the second opening 132 are mirror images of one another and are configured in a substantially identical manner. It should be understood, however, that the first opening 130 and the second opening 132 need not be mirror images of each other and could be configured differently from each other.

The first opening 130 extends in the longitudinal direction of the vehicle body 100 from the front-left door pillar 104 to the rear-left door pillar 106 as well as from the front lateral beam 110 to the rear lateral beam 112. In the elevational direction of the vehicle body 100 (i.e., from bottom to top), the first opening 130 extends from the floor 116 or from a location near the floor 116 (e.g., from a door sill area in configurations that include one) to the roof area of the vehicle body 100, and also extends laterally inward to the central longitudinal beam 114. Thus, in the illustrated example, the first opening 130 is bounded by the floor 116, the front-left door pillar 104, the front lateral beam 110, the central longitudinal beam 114, the rear lateral beam 112, and the rear-left door pillar 106. A portion of the first opening 130 is located on the left lateral side of the vehicle body 100 and defines a door opening area that extends longitudinally from the front-left door pillar 104 to the rear-left door pillar 106. A portion of the first opening 130 is located in the roof area of the vehicle body 100 to the left of the central longitudinal beam 114 and extends longitudinally from the front lateral beam 110 to the rear lateral beam 112.

The second opening 132 extends in the longitudinal direction of the vehicle body 100 from the front-right door pillar 105 to the rear-right door pillar 107 as well as from the front lateral beam 110 to the rear lateral beam 112. In the elevational direction of the vehicle body 100 (i.e., from bottom to top), the second opening 132 extends from the floor 116 or from a location near the floor 116 (e.g., from a door sill area in configurations that include one) to the roof area of the vehicle body 100, and also extends laterally inward to the central longitudinal beam 114. Thus, in the illustrated example, the second opening 132 is bounded by the floor 116, the front-right door pillar 105, the front lateral beam 110, the central longitudinal beam 114, the rear lateral beam 112, and the rear-right door pillar 107. A portion of the second opening 132 is located on the right lateral side of the vehicle body 100 and defines a door opening area that extends longitudinally from the front-right door pillar 105 to the rear-right door pillar 107. A portion of the second opening 132 is located in the roof area of the vehicle body 100 to the right of the central longitudinal beam 114 and extends longitudinally from the front lateral beam 110 to the rear lateral beam 112.

The vehicle body 100 defines an interior space, which may be configured as a passenger cabin or a cargo-holding area. As an example, in the illustrated example, the interior space of the vehicle body 100 is configured as a passenger cabin with one or more front seats 134 near the front lower body portion 118 and one or more rear seats 136 near the rear lower body portion 120 and oriented with the front seats 134 facing rearward and the rear seats 136 facing frontward such that passengers face toward a longitudinal midpoint of the vehicle body 100 in a stagecoach seating arrangement. As a result of this arrangement, the first opening 130 and the second opening 132 are located between the front seats 134 and the rear seats 136 such that passengers may enter the interior space of the vehicle body 100 through the first opening 130 and the second opening 132 and easily access the front seats 134 and the rear seats 136.

Thus, for example, the vehicle body 100 may include one or more front seats, such as the front seats 134, that face rearward and are accessible from the first opening 130 and the second opening 132, and the vehicle body 100 may include one or more rear seats, such as the rear seats 136, that face forward and are accessible from the first opening 130 and the second opening 132. In addition, the front seats 134 may be positioned at a front longitudinal end of the first opening 130 and the second opening 132, and the rear seats 136 may be positioned at a rear longitudinal end of the first opening 130 and the second opening 132. In such an arrangement, a portion of each of the first opening 130 and the second opening 132, including a respective longitudinal midpoint of each, is located between the front seats 134 and the rear seats 136.

Figure 4:
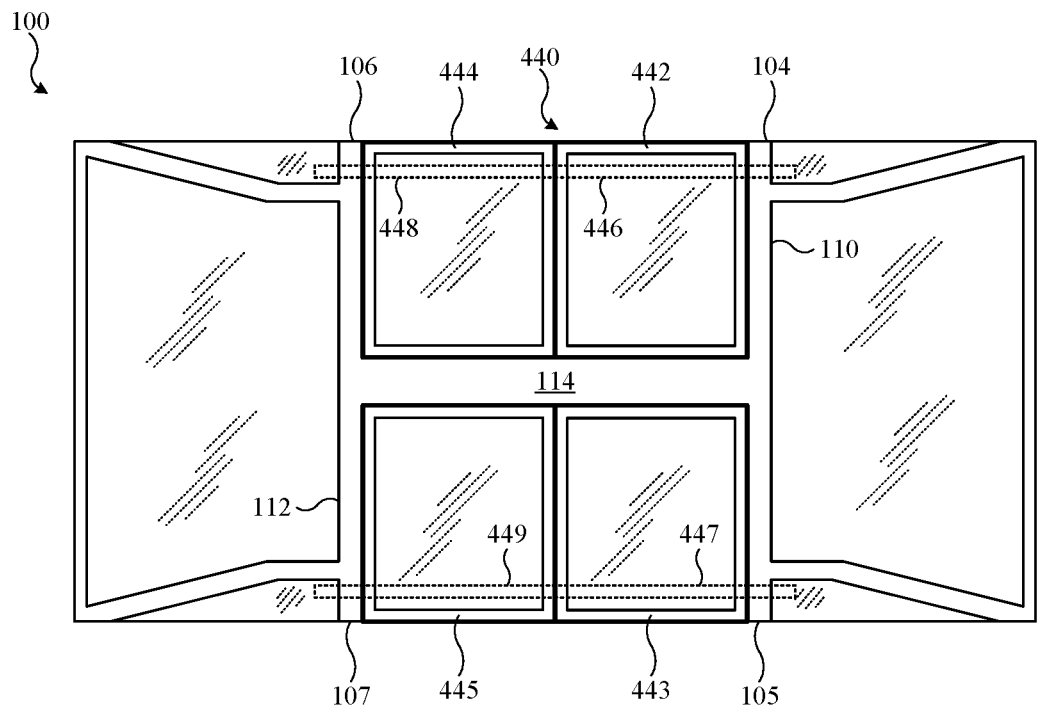
FIG. 4 is a top view of the vehicle body and a first example door and roof panel assembly in a closed position.
Figure 5:
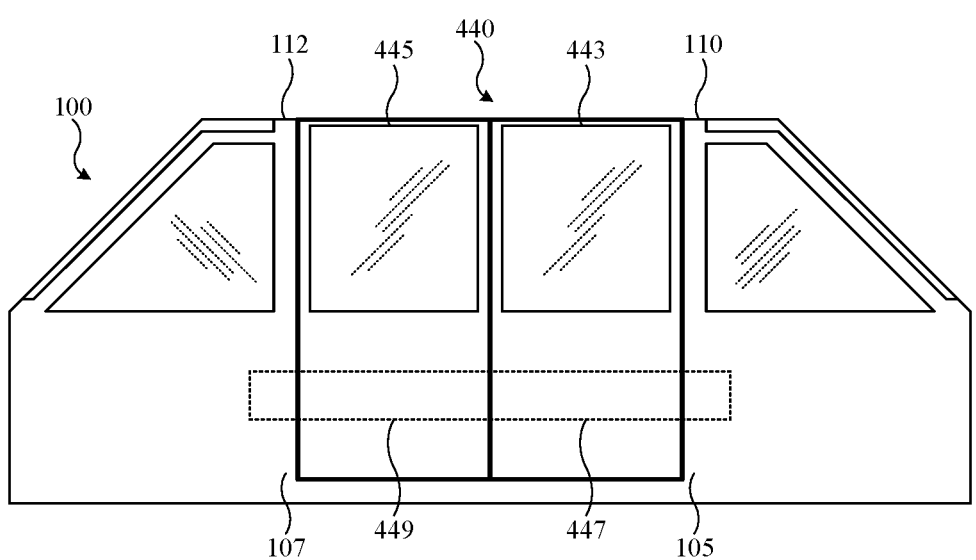
FIG. 5 is a side view of the vehicle body and the first example door and roof panel assembly in the closed position.
Figure 6:
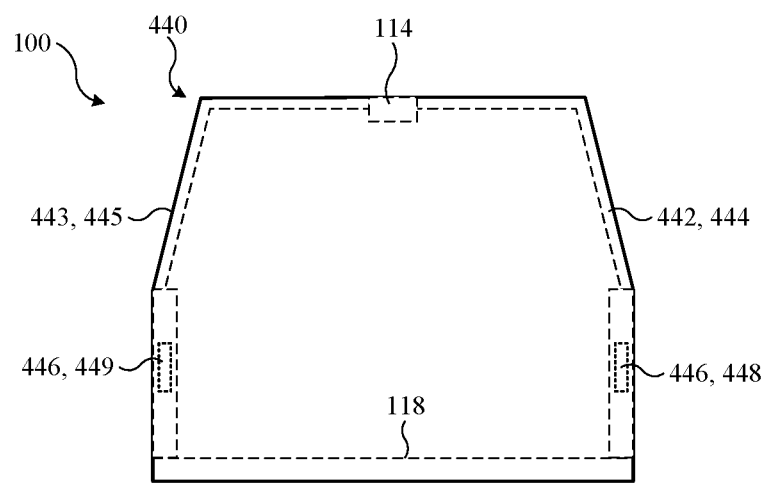
FIG. 6 is a front view of the vehicle body and the first example door and roof panel assembly in the closed position.
Figure 7:
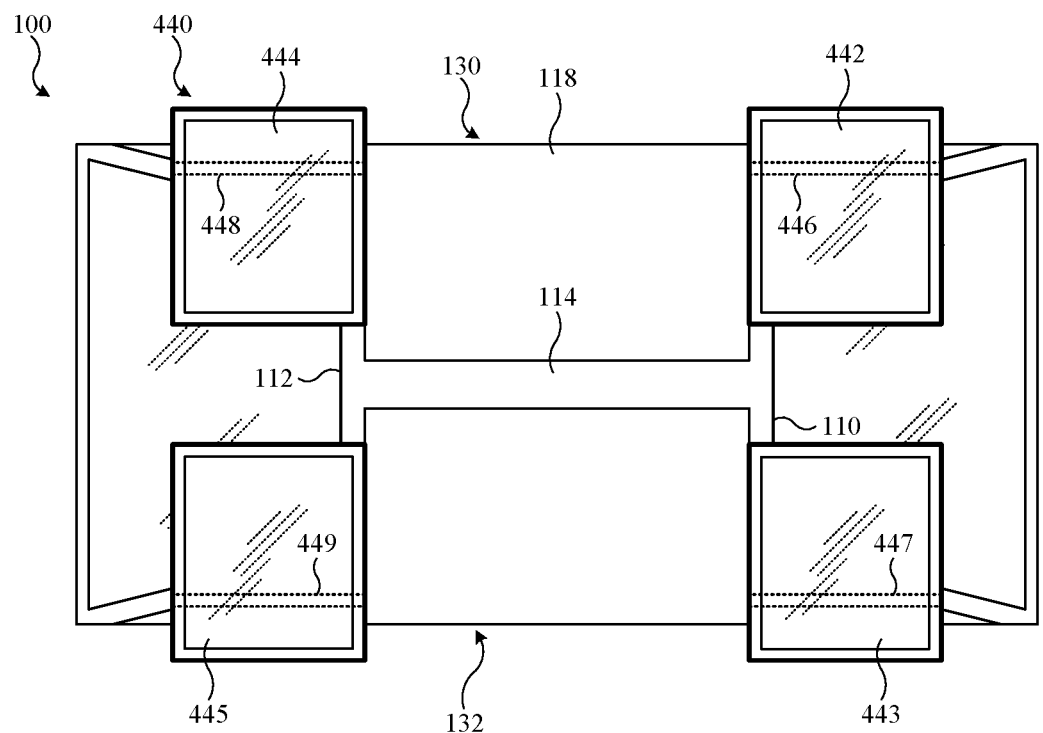
FIG. 7 is a top view of the vehicle body and a first example door and roof panel assembly in an open position.
Figure 8:
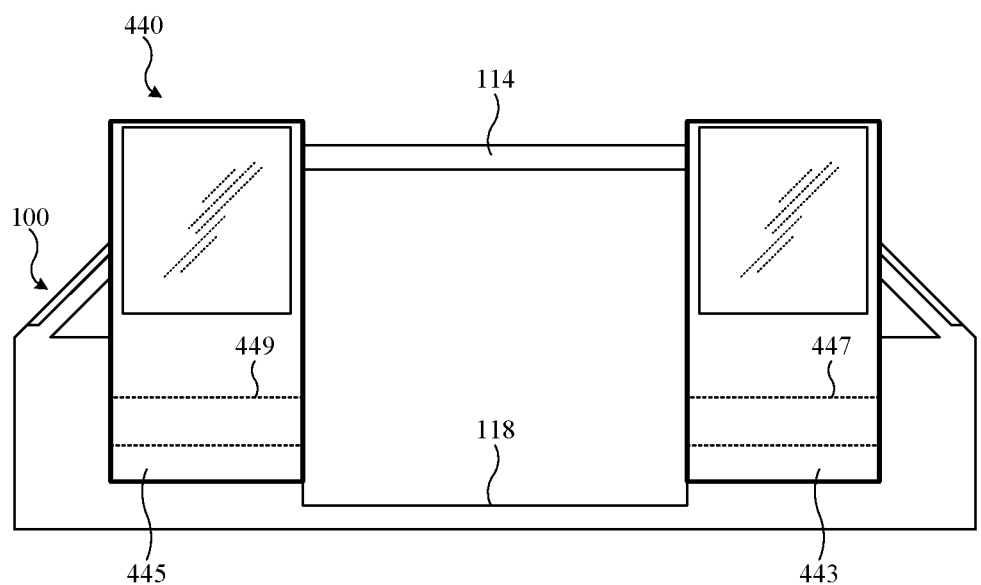
FIG. 8 is a side view of the vehicle body and the first example door and roof panel assembly in the open position.
Figure 9:
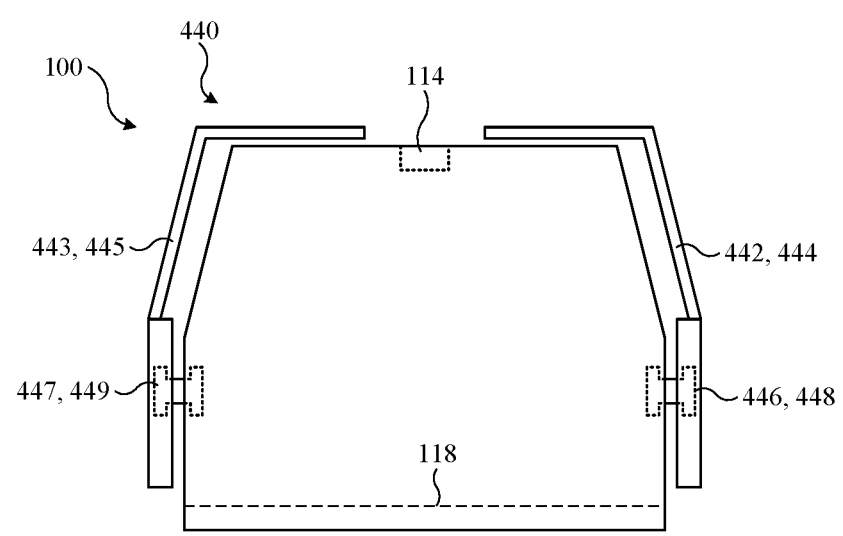
FIG. 9 is a front view of the vehicle body and the first example door and roof panel assembly in the open position.

FIGS. 4-6 show the vehicle body 100 and a first example of a door and roof panel assembly 440 in a closed position, including a top view of the vehicle body 100 and the roof panel assembly 440 in FIG. 4, a side view of the vehicle body 100 and the roof panel assembly 440 in FIG. 5, and a front view of the vehicle body 100 and the roof panel assembly 440 in FIG. 6. FIGS. 7-9 show the vehicle body 100 and the door and roof panel assembly 440 in an open position, including a top view of the vehicle body 100 and the roof panel assembly 440 in FIG. 7, a side view of the vehicle body 100 and the roof panel assembly 440 in FIG. 8, and a front view of the vehicle body 100 and the roof panel assembly 440 in FIG. 9.

The door and roof panel assembly 440 includes four panels that are each combined door and roof panels that each occupy part of the door area and part of the roof area in respective ones of the first opening 130 and the second opening 132. In the illustrated example, the door and roof panel assembly 440 includes a front-left door and roof panel 442, a front-right door and roof panel 443, a rear-left door and roof panel 444, and a rear-right door and roof panel 445. The door and roof panels 442-445 each include a door portion that is configured to occupy the door area of the first opening 130 or the second opening 132 and a roof portion that is configured to occupy the roof area of the first opening 130 or the second opening 132. The door and roof panels 442-445 are each a single unit, with their respective door portions and roof portions being fixed to each other such that they move in unison. The door portions and roof portions of the door and roof panels 442-445 may include transparent portions that function as windows to admit light and allow visibility of the outside environment from inside the vehicle body 100.

The door and roof panels 442-445 are each movable between a closed position (FIGS. 4-6) and an open position (FIGS. 7-9). In the closed position, the door and roof panels 442-445 each occupy a portion of one of the first opening 130 or the second opening 132 and obstruct ingress or egress through that portion of the first opening 130 or the second opening 132. In the open position, each of the door and roof panels 442-445, respectively, are moved out of the first opening 130 or the second opening 132 to an extent that is sufficient to allow ingress or egress through that portion of the first opening 130 or the second opening 132.

In the closed position, the front-left door and roof panel 442 is located in first opening 130 such that it obstructs ingress or egress through part of the first opening 130. In particular, the front-left door and roof panel 442 is located in the first opening 130 adjacent to the front-left door pillar 104 and extends longitudinally to an intermediate location between the front-left door pillar 104 and the rear-left door pillar 106 where it meets the rear-left door and roof panel 444. In the illustrated example, the vehicle body 100 lacks structural elements that are located between the front-left door and roof panel 442 and the rear-left door and roof panel 444, such that the front-left door and roof panel 442 and the rear-left door and roof panel 444 are in engagement with one another in the closed position. A lower end of the front-left door and roof panel 442 is adjacent to the floor 116 of the vehicle body 100 in the closed position, and an upper end of the front-left door and roof panel 442 is adjacent to the central longitudinal beam 114 in the closed position.

To move from the closed position to the open position, the front-left door and roof panel 442 is connected to the vehicle body 100 by a front-left slide assembly 446. As an example, the front-left slide assembly 446 could include a rail that is located in a door area of the front-left door and roof panel 442 and supported by a sliding carriage that is slidably connected to the rail and also connected to the vehicle body 100 by a support arm that is able to move the front-left door and roof panel 442 outward and upward relative to the first opening 130. Actuators (e.g., electric, hydraulic, or pneumatic) may be included in the front-left slide assembly 446 in order to cause motion of the front-left door and roof panel 442 between the closed and open positions. Thus, the front-left door and roof panel 442 may move from the closed position to the open position by first moving outward and upward relative to the first opening 130 such that the front-left door and roof panel 442 is positioned outward and upward from the vehicle body 100, and then sliding the front-left door and roof panel 442 longitudinally forward until the first opening 130 is sufficiently unobstructed so as to allow ingress and egress.

In the closed position, the front-right door and roof panel 443 is located in second opening 132 such that it obstructs ingress or egress through part of the second opening 132. In particular, the front-right door and roof panel 443 is located in the second opening 132 adjacent to the front-right door pillar 105 and extends longitudinally to an intermediate location between the front-right door pillar 105 and the rear-right door pillar 107 where it meets the rear-right door and roof panel 445. In the illustrated example, the vehicle body 100 lacks structural elements that are located between the front-right door and roof panel 443 and the rear-right door and roof panel 445, such that the front-right door and roof panel 443 and the rear-right door and roof panel 445 are in engagement with one another in the closed position. A lower end of the front-right door and roof panel 443 is adjacent to the floor 116 of the vehicle body 100 in the closed position, and an upper end of the front-right door and roof panel 443 is adjacent to the central longitudinal beam 114 in the closed position.

To move from the closed position to the open position, the front-right door and roof panel 443 is connected to the vehicle body 100 by a front-right slide assembly 447. As an example, the front-right slide assembly 447 could include a rail that is located in a door area of the front-right door and roof panel 443 and supported by a sliding carriage that is slidably connected to the rail and also connected to the vehicle body 100 by a support arm that is able to move the front-right door and roof panel 443 outward and upward relative to the second opening 132. Actuators (e.g., electric, hydraulic, or pneumatic) may be included in the front-right slide assembly 447 in order to cause motion of the front-right door and roof panel 443 between the closed and open positions. Thus, the front-right door and roof panel 443 may move from the closed position to the open position by first moving outward and upward relative to the second opening 132 such that the front-right door and roof panel 443 is positioned outward and upward from the vehicle body 100, and then sliding the front-right door and roof panel 443 longitudinally forward until the second opening 132 is sufficiently unobstructed so as to allow ingress and egress. Thus, the front-left door and roof panel 442 and the rear-left door and roof panel 444 slide longitudinally away from each other during movement from the closed position to the open position.

In the closed position, the rear-left door and roof panel 444 is located in first opening 130 such that it obstructs ingress or egress through part of the first opening 130. In particular, the rear-left door and roof panel 444 is located in the first opening 130 adjacent to the rear-left door pillar 106 and extends longitudinally to an intermediate location between the rear-left door pillar 106 and the front-left door pillar 104 where it meets the front-left door and roof panel 442. A lower end of the rear-left door and roof panel 444 is adjacent to the floor 116 of the vehicle body 100 in the closed position, and an upper end of the rear-left door and roof panel 444 is adjacent to the central longitudinal beam 114 in the closed position.

To move from the closed position to the open position, the rear-left door and roof panel 444 is connected to the vehicle body 100 by a rear-left slide assembly 448. As an example, the rear-left slide assembly 448 could include a rail that is located in a door area of the rear-left door and roof panel 444 and supported by a sliding carriage that is slidably connected to the rail and also connected to the vehicle body 100 by a support arm that is able to move the rear-left door and roof panel 444 outward and upward relative to the first opening 130. Actuators (e.g., electric, hydraulic, or pneumatic) may be included in the rear-left slide assembly 448 in order to cause motion of the rear-left door and roof panel 444 between the closed and open positions. Thus, the rear-left door and roof panel 444 may move from the closed position to the open position by first moving outward and upward relative to the first opening 130 such that the rear-left door and roof panel 444 is positioned outward and upward from the vehicle body 100, and then sliding the rear-left door and roof panel 444 longitudinally rearward until the first opening 130 is sufficiently unobstructed so as to allow ingress and egress.

In the closed position, the rear-right door and roof panel 445 is located in second opening 132 such that it obstructs ingress or egress through part of the second opening 132. In particular, the rear-right door and roof panel 445 is located in the second opening 132 adjacent to the rear-right door pillar 107 and extends longitudinally to an intermediate location between the rear-right door pillar 107 and the front-right door pillar 105 where it meets the front-right door and roof panel 443. A lower end of the rear-right door and roof panel 445 is adjacent to the floor 116 of the vehicle body 100 in the closed position, and an upper end of the rear-right door and roof panel 445 is adjacent to the central longitudinal beam 114 in the closed position. Thus, the front-right door and roof panel 443 and the rear-right door and roof panel 445 slide longitudinally away from each other during movement from the closed position to the open position.

To move from the closed position to the open position, the rear-right door and roof panel 445 is connected to the vehicle body 100 by a rear-right slide assembly 449. As an example, the rear-right slide assembly 449 could include a rail that is located in a door area of the rear-right door and roof panel 445 and supported by a sliding carriage that is slidably connected to the rail and also connected to the vehicle body 100 by a support arm that is able to move the rear-right door and roof panel 445 outward and upward relative to the second opening 132. Actuators (e.g., electric, hydraulic, or pneumatic) may be included in the rear-right slide assembly 449 in order to cause motion of the rear-right door and roof panel 445 between the closed and open positions. Thus, the rear-right door and roof panel 445 may move from the closed position to the open position by first moving outward and upward relative to the second opening 132 such that the rear-right door and roof panel 445 is positioned outward and upward from the vehicle body 100, and then sliding the rear-right door and roof panel 445 longitudinally rearward until the second opening 132 is sufficiently unobstructed so as to allow ingress and egress.

Figure 10:
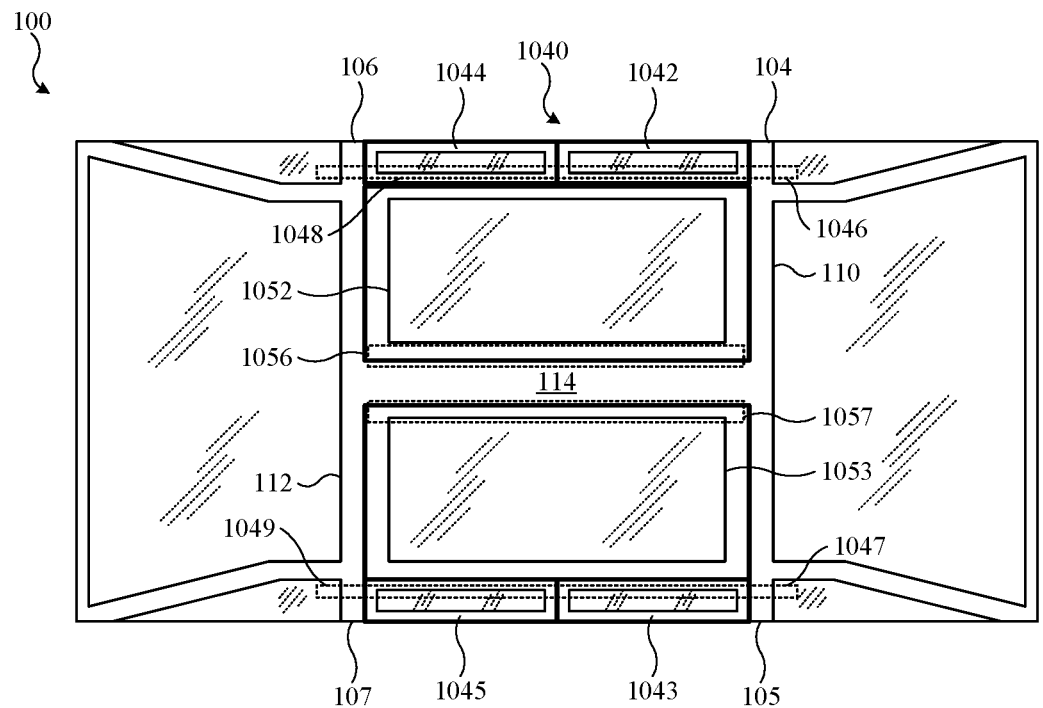
FIG. 10 is a top view of the vehicle body and a second example door and roof panel assembly in a closed position.
Figure 11:
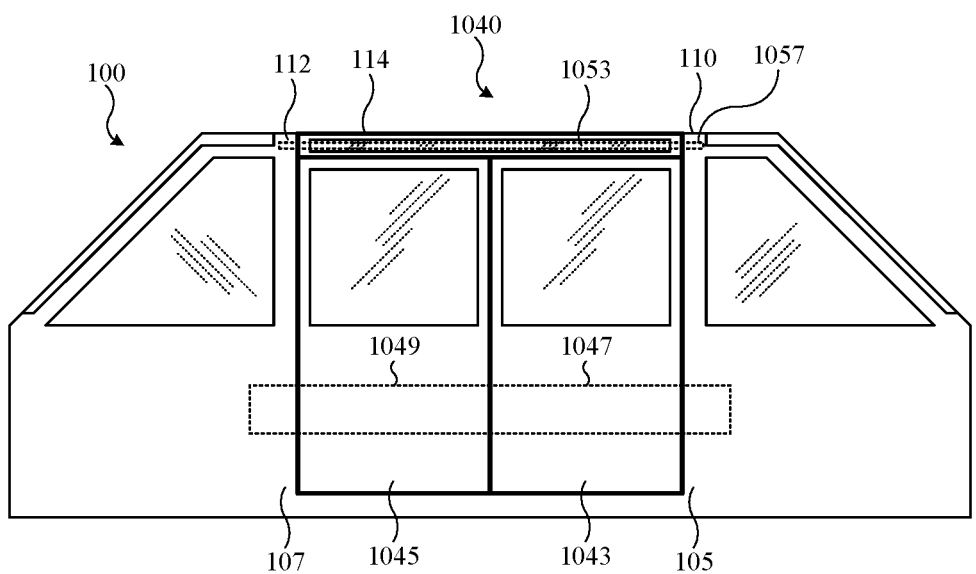
FIG. 11 is a side view of the vehicle body and the second example door and roof panel assembly in the closed position.
Figure 12:
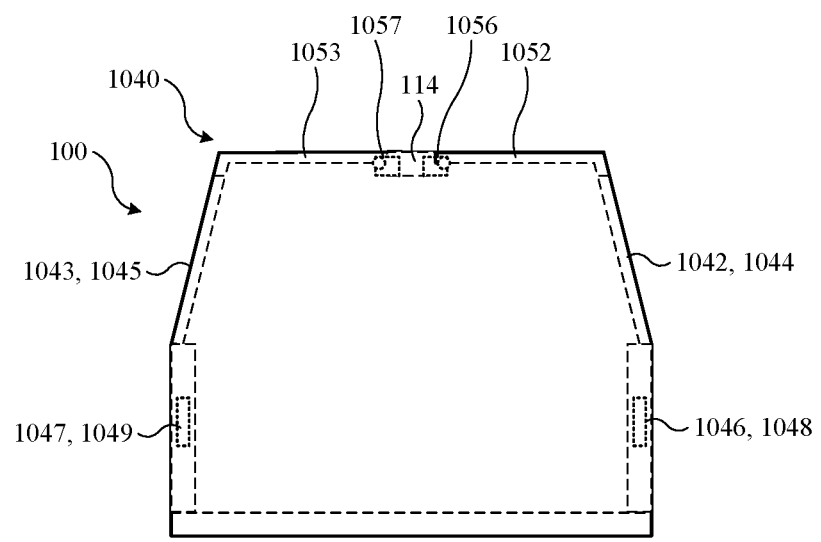
FIG. 12 is a front view of the vehicle body and the second example door and roof panel assembly in the closed position.
Figure 13:
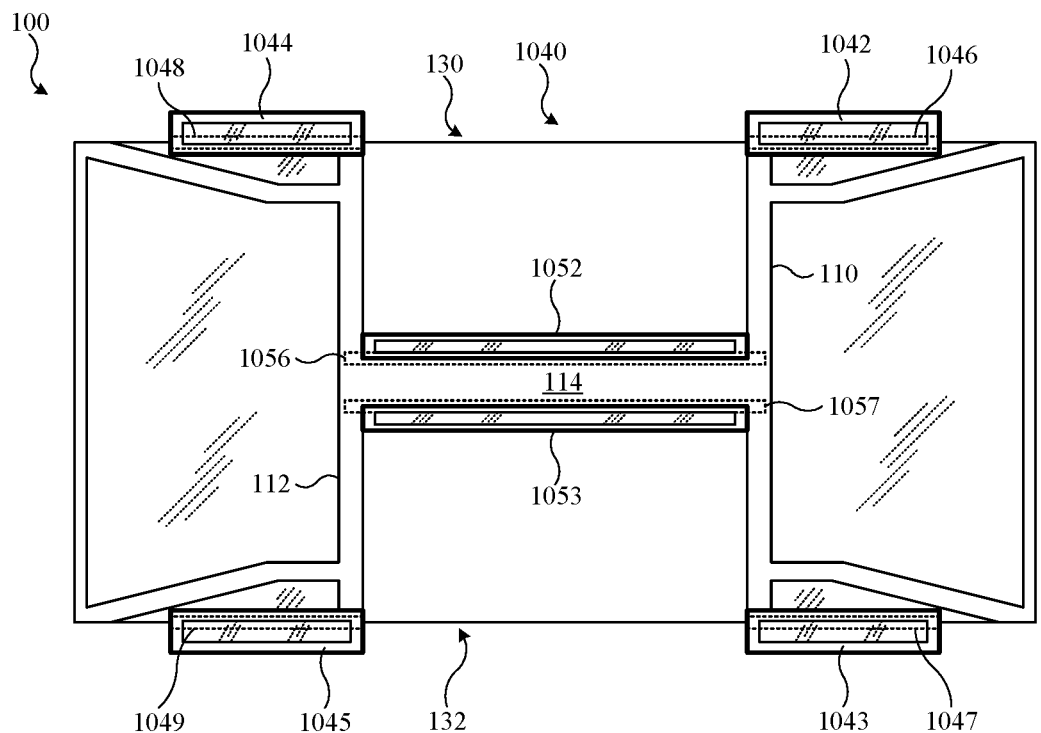
FIG. 13 is a top view of the vehicle body and a second example door and roof panel assembly in an open position.
Figure 14:
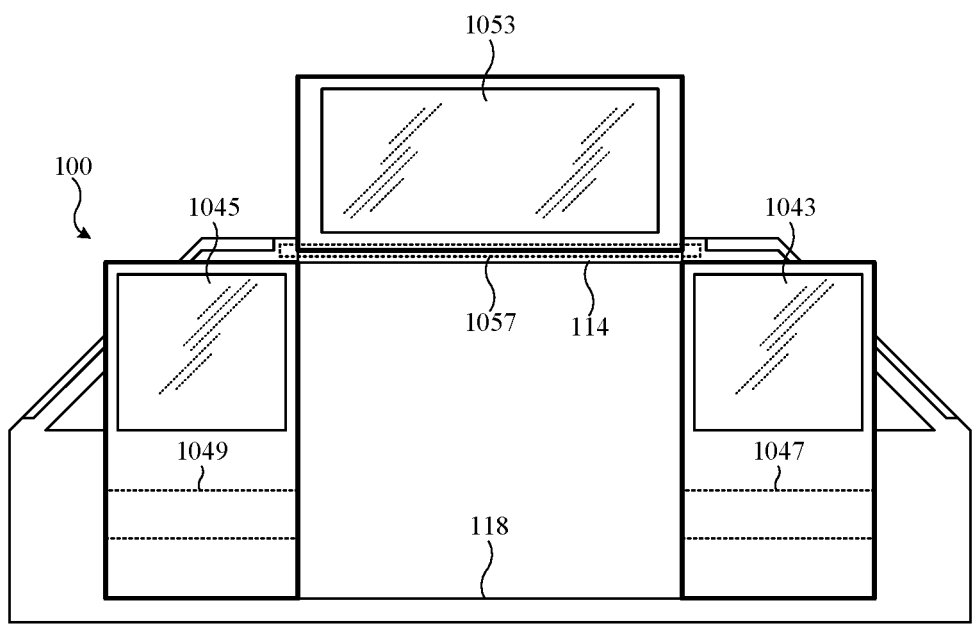
FIG. 14 is a side view of the vehicle body and the second example door and roof panel assembly in the open position.
Figure 15:
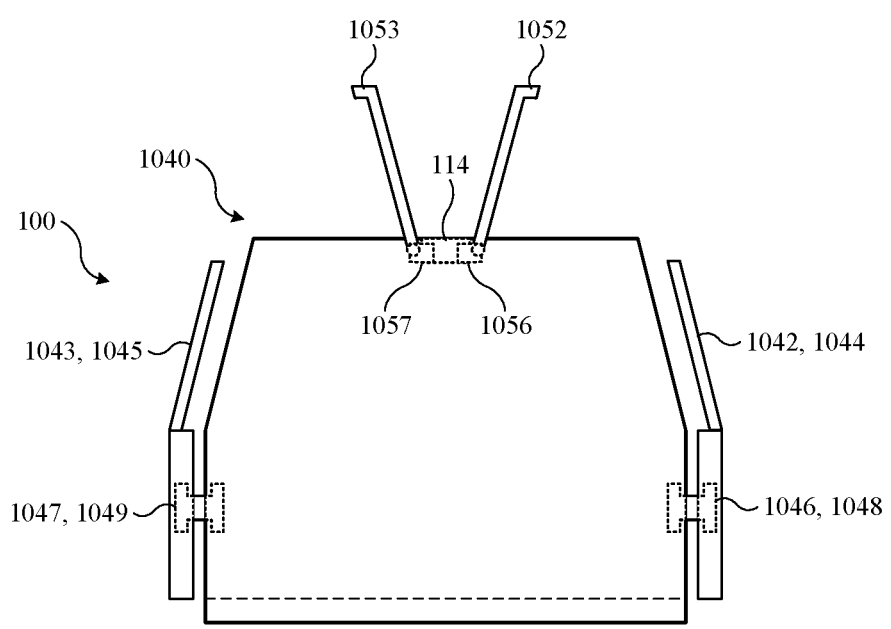
FIG. 15 is a front view of the vehicle body and the second example door and roof panel assembly in the open position.

FIGS. 10-12 show the vehicle body 100 and a second example of a door and roof panel assembly 1040 in a closed position, including a top view of the vehicle body 100 and the roof panel assembly 1040 in FIG. 10, a side view of the vehicle body 100 and the roof panel assembly 1040 in FIG. 11, and a front view of the vehicle body 100 and the roof panel assembly 1040 in FIG. 12. FIGS. 13-15 show the vehicle body 100 and the door and roof panel assembly 1040 in an open position, including a top view of the vehicle body 100 and the roof panel assembly 1040 in FIG. 13, a side view of the vehicle body 100 and the roof panel assembly 1040 in FIG. 14, and a front view of the vehicle body 100 and the roof panel assembly 1040 in FIG. 15.

The door and roof panel assembly 1040 includes four door panels and two roof panels. Pairs of the door panels cooperate with one of the roof panels to occupy part of the door area and part of the roof area in respective ones of the first opening 130 and the second opening 132. In the illustrated example, the door and roof panel assembly 1040 includes a front-left door panel 1042, a front-right door panel 1043, a rear-left door panel 1044, a rear-right door panel 1045, a left roof panel 1052, and right roof panel 1053.

The door panels 1042-1045 and the roof panels 1052-1053 are each movable between a closed position (FIGS. 10-12) and an open position (FIGS. 13-15). In the closed position, the door panels 1042-1045 and the roof panels 1052-1053 each occupy a portion of one of the first opening 130 or the second opening 132 and obstruct ingress or egress through that portion of the first opening 130 or the second opening 132. In the open position, each of the door panels 1042-1045 and each of the roof panels 1052-1053, respectively, are moved out of the first opening 130 or the second opening 132 to an extent that is sufficient to allow ingress or egress through that portion of the first opening 130 or the second opening 132. The roof panels 1052-1053 are separate from the door panels 1042-1045 and are able to move independent of the door panels 1042-1045 between the closed position and the open position. The door panels 1042-1045 and the roof panels 1052-1053 may include transparent portions that function as windows to admit light and allow visibility of the outside environment from inside the vehicle body 100.

In the closed position, the front-left door panel 1042, the rear-left door panel 1044, and the left roof panel 1052 are located in first opening 130 such that they obstruct ingress or egress through part of the first opening 130. In particular, the front-left door panel 1042 is located in the first opening 130 adjacent to the front-left door pillar 104 and extends longitudinally toward the rear-left door pillar 106 to an intermediate location where it meets the rear-left door panel 1044. In the illustrated example, the vehicle body 100 lacks structural elements that are located between the front-left door panel 1042 and the rear-left door panel 1044, such that the front-left door panel 1042 and the rear-left door panel 1044 are in engagement with one another in the closed position. The rear-left door panel 1044 extends from the intermediate location to the rear-left door pillar 106. Lower ends of the front-left door panel 1042 and the rear-left door panel 1044 are adjacent to the floor 116 of the vehicle body 100 in the closed position, and upper ends of the front-left door panel 1042 and the rear-left door panel 1044 are adjacent to the left roof panel 1052. The left roof panel 1052 extends longitudinally from the front lateral beam 110 to the rear lateral beam 112 and extends laterally inward from the front-left door panel 1042 and the rear-left door panel 1044 to the central longitudinal beam 114 of the vehicle body 100 in the closed position.

To move from the closed position to the open position, the front-left door panel 1042 is connected to the vehicle body 100 by a front-left slide assembly 1046, the rear-left door panel 1044 is connected to the vehicle body 100 by a rear-left slide assembly 1048, and the left roof panel 1052 is connected to the vehicle body 100 by a left pivot assembly 1056. As an example, the front-left slide assembly 1046 and the rear-left slide assembly 1048 could each include a rail that is located in a door area of a respective one the front-left door panel 1042 and the rear-left door panel 1044 and supported by a sliding carriage that is slidably connected to the rail and also connected to the vehicle body 100 by a support arm that is able to move the respective one of the front-left door panel 1042 and the rear-left door panel 1044 outward relative to the first opening 130. Actuators (e.g., electric, hydraulic, or pneumatic) may be included in the front-left slide assembly 1046 and the rear-left slide assembly 1048 in order to cause motion of the front-left door panel 1042 and the rear-left door panel 1044 between the closed and open positions. The left pivot assembly 1056 includes rotational joints and actuators that connect the left roof panel 1052 to the central longitudinal beam 114 and/or to the front lateral beam 110 and the rear lateral beam 112 to cause pivotal motion of the left roof panel 1052 relative to the vehicle body 100.

The front-left door panel 1042 may move from the closed position to the open position by first moving outward relative to the first opening 130 such that the front-left door panel 1042 is positioned outward from the vehicle body 100, and then sliding the front-left door panel 1042 longitudinally forward until the first opening 130 is sufficiently unobstructed so as to allow ingress and egress. The rear-left door panel 1044 may move from the closed position to the open position by first moving outward relative to the first opening 130 such that the rear-left door panel 1044 is positioned outward from the vehicle body 100, and then sliding the rear-left door panel 1044 longitudinally rearward and away from the front-left door panel 1042 until the first opening 130 is sufficiently unobstructed so as to allow ingress and egress. Thus, the front-left door panel 1042 and the rear-left door panel 1044 slide longitudinally away from each other during movement from the closed position to the open position. The left roof panel 1052 moves from the closed position to the open position by pivoting upward such that an outboard end of the left roof panel 1052 moves upward and away from the vehicle body 100.

In the closed position, the front-right door panel 1043, the rear-right door panel 1045, and the right roof panel 1053 are located in second opening 132 such that they obstruct ingress or egress through part of the second opening 132. In particular, the front-right door panel 1043 is located in the second opening 132 adjacent to the front-right door pillar 105 and extends longitudinally toward the rear-right door pillar 107 to an intermediate location where it meets the rear-right door panel 1045. In the illustrated example, the vehicle body 100 lacks structural elements that are located between the front-right door panel 1043 and the rear-right door panel 1045, such that the front-right door panel 1043 and the rear-right door panel 1045 are in engagement with one another in the closed position. The rear-right door panel 1045 extends from the intermediate location to the rear-right door pillar 107. Lower ends of the front-right door panel 1043 and the rear-right door panel 1045 are adjacent to the floor 116 of the vehicle body 100 in the closed position, and upper ends of the front-right door panel 1043 and the rear-right door panel 1045 are adjacent to the right roof panel 1053. The right roof panel 1053 extends longitudinally from the front lateral beam 110 to the rear lateral beam 112 and extends laterally inward from the front-right door panel 1043 and the rear-right door panel 1045 to the central longitudinal beam 114 of the vehicle body 100 in the closed position.

To move from the closed position to the open position, the front-right door panel 1043 is connected to the vehicle body 100 by a front-right slide assembly 1047, the rear-right door panel 1045 is connected to the vehicle body 100 by a rear-right slide assembly 1049, and the right roof panel 1053 is connected to the vehicle body 100 by a right pivot assembly 1057. As an example, the front-right slide assembly 1047 and the rear-right slide assembly 1049 could each include a rail that is located in a door area of a respective one the front-right door panel 1043 and the rear-right door panel 1045 and supported by a sliding carriage that is slidably connected to the rail and also connected to the vehicle body 100 by a support arm that is able to move the respective one of the front-right door panel 1043 and the rear-right door panel 1045 outward relative to the second opening 132. Actuators (e.g., electric, hydraulic, or pneumatic) may be included in the front-right slide assembly 1047 and the rear-right slide assembly 1049 in order to cause motion of the front-right door panel 1043 and the rear-right door panel 1045 between the closed and open positions. The right pivot assembly 1057 includes rotational joints and actuators that connect the right roof panel 1053 to the central longitudinal beam 114 and/or to the front lateral beam 110 and the rear lateral beam 112 to cause pivotal motion of the right roof panel 1053 relative to the vehicle body 100.

The front-right door panel 1043 may move from the closed position to the open position by first moving outward relative to the second opening 132 such that the front-right door panel 1043 is positioned outward from the vehicle body 100, and then sliding the front-right door panel 1043 longitudinally forward until the second opening 132 is sufficiently unobstructed so as to allow ingress and egress. The rear-right door panel 1045 may move from the closed position to the open position by first moving outward relative to the second opening 132 such that the rear-right door panel 1045 is positioned outward from the vehicle body 100, and then sliding the rear-right door panel 1045 longitudinally rearward and away from the front-right door panel 1043 until the second opening 132 is sufficiently unobstructed so as to allow ingress and egress. Thus, the front-right door panel 1043 and the rear-right door panel 1045 slide longitudinally away from each other during movement from the closed position to the open position. The right roof panel 1053 moves from the closed position to the open position by pivoting upward such that an outboard end of the right roof panel 1053 moves upward and away from the vehicle body 100.

Figure 16:
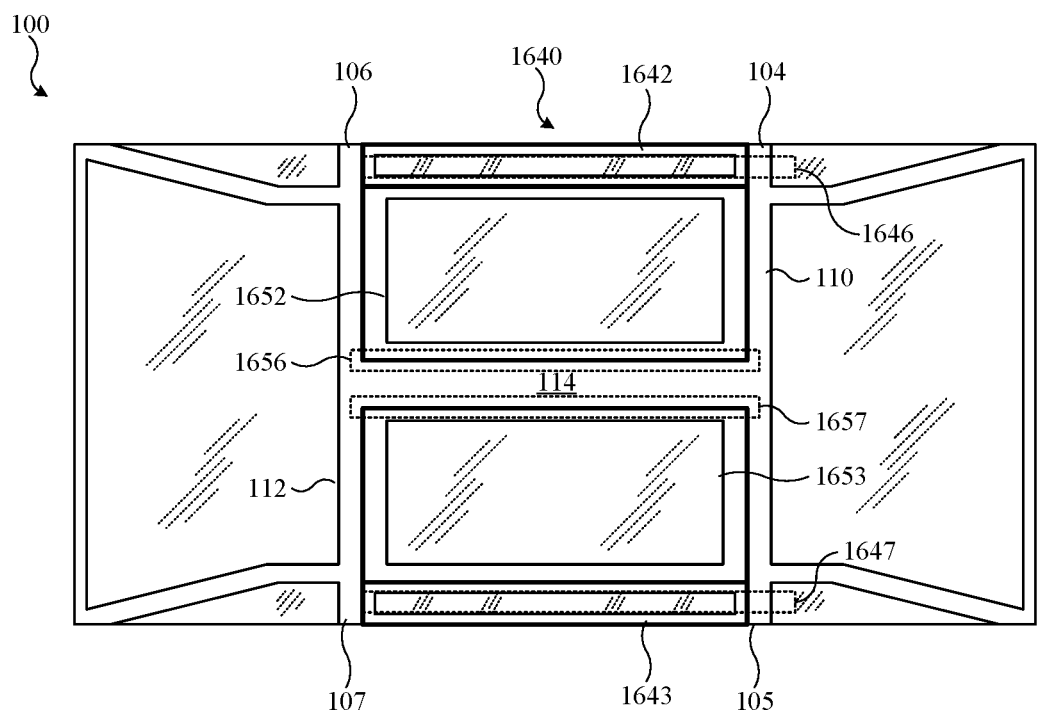
FIG. 16 is a top view of the vehicle body and a third example door and roof panel assembly in a closed position.
Figure 17:
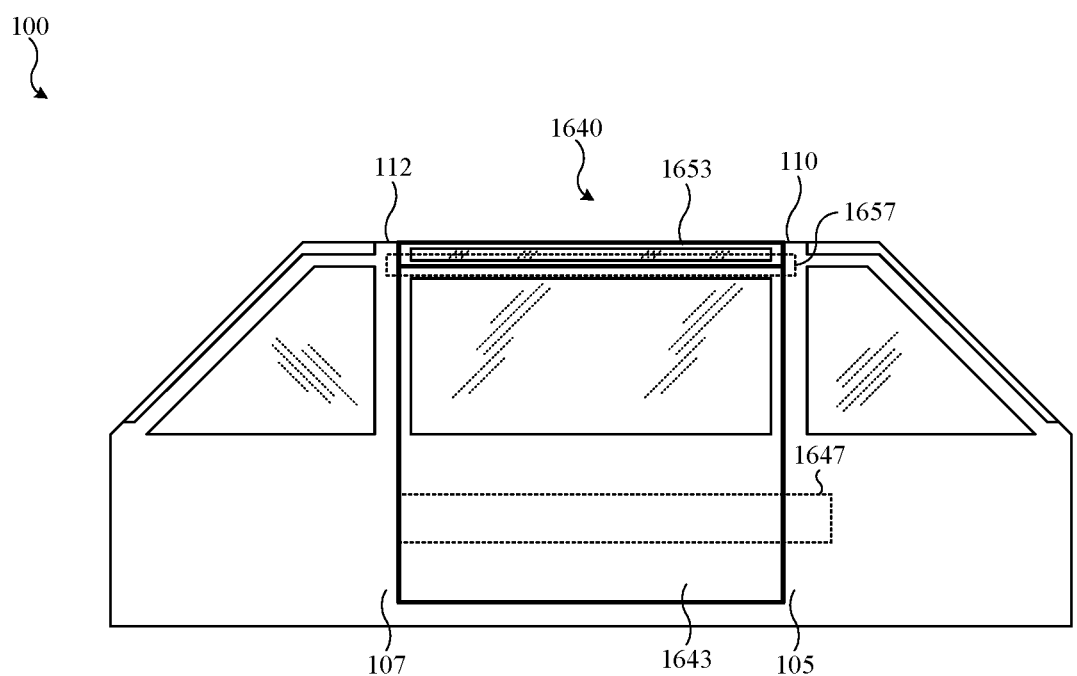
FIG. 17 is a side view of the vehicle body and the third example door and roof panel assembly in the closed position.
Figure 18:
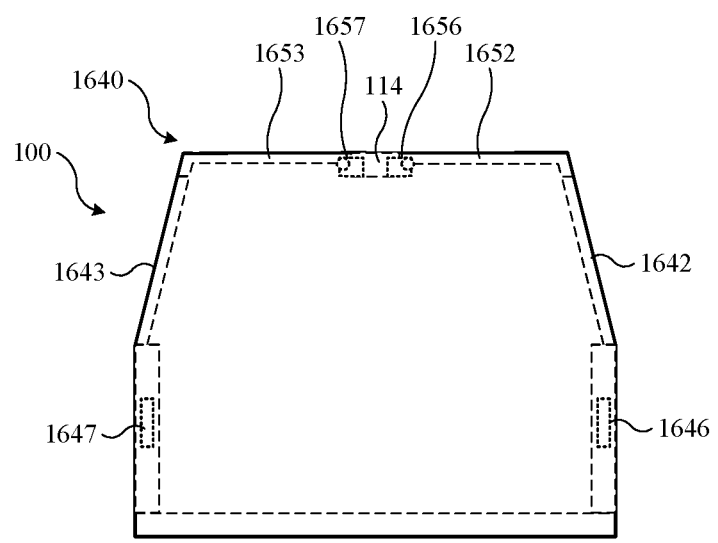
FIG. 18 is a front view of the vehicle body and the third example door and roof panel assembly in the closed position.
Figure 19:
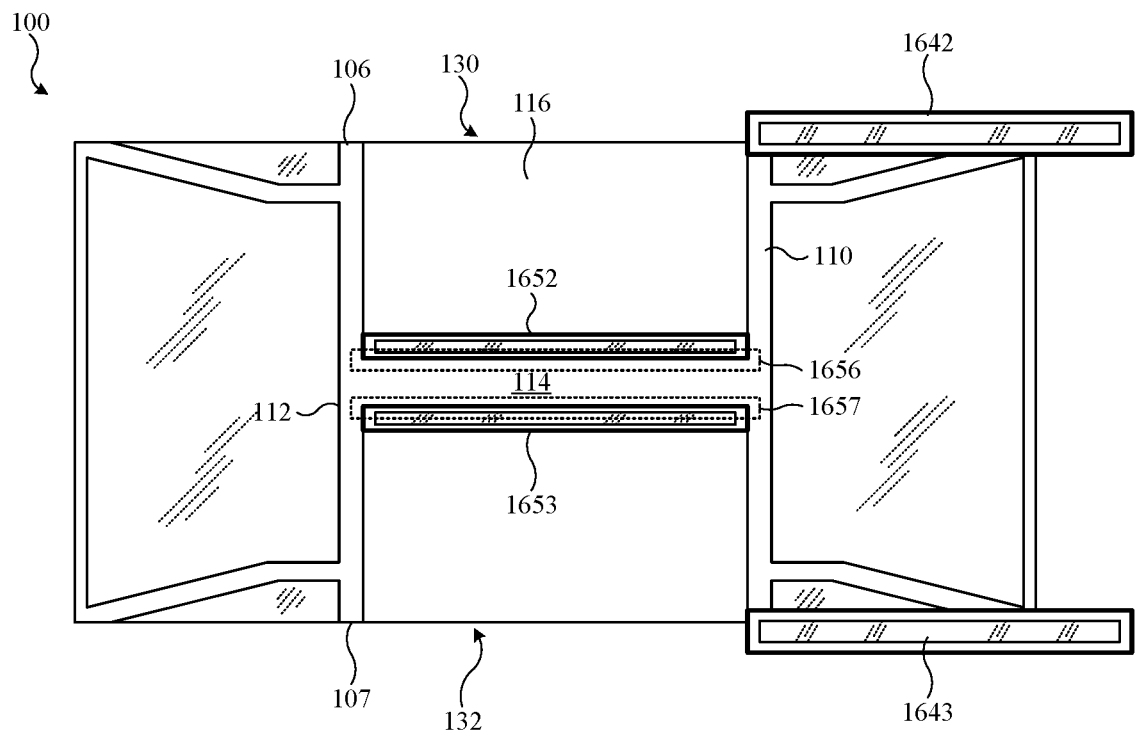
FIG. 19 is a top view of the vehicle body and a third example door and roof panel assembly in an open position.
Figure 20:
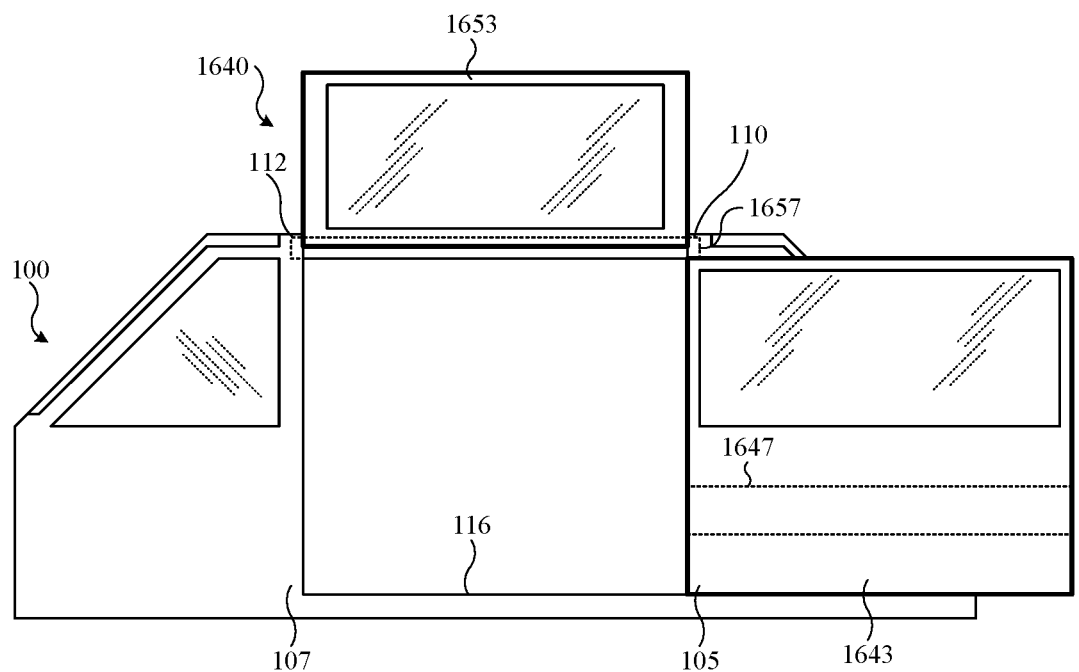
FIG. 20 is a side view of the vehicle body and the third example door and roof panel assembly in the open position.
Figure 21:
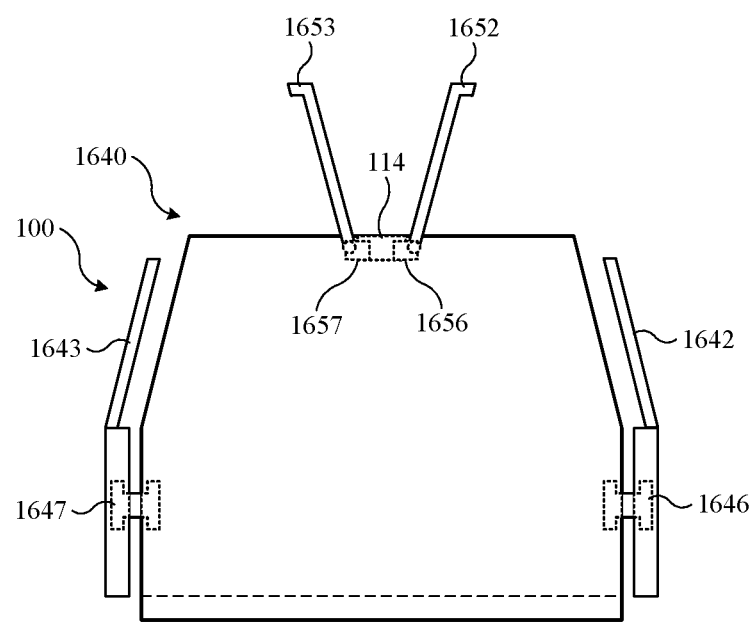
FIG. 21 is a front view of the vehicle body and the third example door and roof panel assembly in the open position.

FIGS. 16-18 show the vehicle body 100 and a third example of a door and roof panel assembly 1640 in a closed position, including a top view of the vehicle body 100 and the roof panel assembly 1640 in FIG. 16, a side view of the vehicle body 100 and the roof panel assembly 1640 in FIG. 17, and a front view of the vehicle body 100 and the roof panel assembly 1640 in FIG. 18. FIGS. 19-21 show the vehicle body 100 and the door and roof panel assembly 1640 in an open position, including a top view of the vehicle body 100 and the roof panel assembly 1640 in FIG. 19, a side view of the vehicle body 100 and the roof panel assembly 1640 in FIG. 20, and a front view of the vehicle body 100 and the roof panel assembly 1640 in FIG. 21.

The door and roof panel assembly 1640 includes two door panels and two roof panels. Each of the door panels cooperates with one of the roof panels to occupy part of the door area and part of the roof area in respective ones of the first opening 130 and the second opening 132. In the illustrated example, the door and roof panel assembly 1640 includes a left door panel 1642, a right door panel 1643, a left roof panel 1652, and right roof panel 1653.

The door panels 1642-1643 and the roof panels 1642-1653 are each movable between a closed position (FIGS. 16-18) and an open position (FIGS. 19-21). In the closed position, the door panels 1642-1643 and the roof panels 1652-1653 each occupy a portion of one of the first opening 130 or the second opening 132 and obstruct ingress or egress through that portion of the first opening 130 or the second opening 132. In the open position, each of the door panels 1642-1643 and each of the roof panels 1652-1653, respectively, are moved out of the first opening 130 or the second opening 132 to an extent that is sufficient to allow ingress or egress through that portion of the first opening 130 or the second opening 132. The roof panels 1652-1653 are separate from the door panels 1642-1643 and are able to move independent of the door panels 1642-1643 between the closed position and the open position.

In the closed position, the left door panel 1642 and the left roof panel 1652 are located in first opening 130 such that they obstruct ingress or egress through part of the first opening 130. In particular, the left door panel 1642 is located in the first opening 130 and extends longitudinally between the front-left door pillar 104 and the rear-left door pillar 106. A lower end of the left door panel 1642 is adjacent to the floor 116 of the vehicle body 100 in the closed position, and an upper end of the left door panel 1642 is adjacent to the left roof panel 1652. The left roof panel 1652 extends longitudinally from the front lateral beam 110 to the rear lateral beam 112 and extends laterally inward from the left door panel 1642 to the central longitudinal beam 114 of the vehicle body 100 in the closed position.

To move from the closed position to the open position, the left door panel 1642 is connected to the vehicle body 100 by a left slide assembly 1646 and the left roof panel 1652 is connected to the vehicle body 100 by a left pivot assembly 1656. As an example, the left slide assembly 1646 can include a rail that is located in a door area of the left door panel 1642 and is supported by a sliding carriage that is slidably connected to the rail and also connected to the vehicle body 100 by a support arm that is able to move the left door panel 1642 outward relative to the first opening 130. Actuators (e.g., electric, hydraulic, or pneumatic) may be included in the left slide assembly 1646 in order to cause motion of the left door panel 1642 between the closed and open positions. The left pivot assembly 1656 includes rotational joints and actuators that connect the left roof panel 1652 to the central longitudinal beam 114 and/or to the front lateral beam 110 and the rear lateral beam 112 to cause pivotal motion of the left roof panel 1652 relative to the vehicle body 100.

The left door panel 1642 may move from the closed position to the open position by first moving outward relative to the first opening 130 such that the left door panel 1642 is positioned outward from the vehicle body 100, and then sliding the left door panel 1642 longitudinally forward until the first opening 130 is sufficiently unobstructed so as to allow ingress and egress. As an alternative, the left door panel 1642 may move from the closed position to the open position by first moving outward relative to the first opening 130 such that the left door panel 1642 is positioned outward from the vehicle body 100, and then sliding the left door panel 1642 longitudinally rearward until the first opening 130 is sufficiently unobstructed so as to allow ingress and egress. The left roof panel 1652 moves from the closed position to the open position by pivoting upward such that an outboard end of the left roof panel 1652 moves upward and away from the vehicle body 100.

In the closed position, the right door panel 1643 and the right roof panel 1653 are located in second opening 132 such that they obstruct ingress or egress through part of the second opening 132. In particular, the right door panel 1643 is located in the second opening 132 and extends longitudinally from the front-right door pillar 105 to the rear-right door pillar 107. A lower end of the right door panel 1643 is adjacent to the floor 116 of the vehicle body 100 in the closed position, and an upper end of the right door panel 1643 is adjacent to the right roof panel 1653. The right roof panel 1653 extends longitudinally from the front lateral beam 110 to the rear lateral beam 112 and extends laterally inward from the right door panel 1643 to the central longitudinal beam 114 of the vehicle body 100 in the closed position.

To move from the closed position to the open position, the right door panel 1643 is connected to the vehicle body 100 by a right slide assembly 1647 and the right roof panel 1653 is connected to the vehicle body 100 by a right pivot assembly 1657. As an example, the right slide assembly 1647 can include a rail that is located in a door area of the right door panel 1643 and is supported by a sliding carriage that is slidably connected to the rail and also connected to the vehicle body 100 by a support arm that is able to move the right door panel 1643 outward relative to the second opening 132. Actuators (e.g., electric, hydraulic, or pneumatic) may be included in the right slide assembly 1647 in order to cause motion of the right door panel 1643 between the closed and open positions. The right pivot assembly 1657 includes rotational joints and actuators that connect the right roof panel 1653 to the central longitudinal beam 114 and/or to the front lateral beam 110 and the rear lateral beam 112 to cause pivotal motion of the right roof panel 1653 relative to the vehicle body 100.

The right door panel 1643 may move from the closed position to the open position by first moving outward relative to the second opening 132 such that the right door panel 1643 is positioned outward from the vehicle body 100, and then sliding the right door panel 1643 longitudinally forward until the second opening 132 is sufficiently unobstructed so as to allow ingress and egress. As an alternative, the right door panel 1643 may move from the closed position to the open position by first moving outward relative to the second opening 132 such that the right door panel 1643 is positioned outward from the vehicle body 100, and then sliding the right door panel 1643 longitudinally rearward until the second opening 132 is sufficiently unobstructed so as to allow ingress and egress. The right roof panel 1653 moves from the closed position to the open position by pivoting upward such that an outboard end of the right roof panel 1653 moves upward and away from the vehicle body 100.

Figure 22:
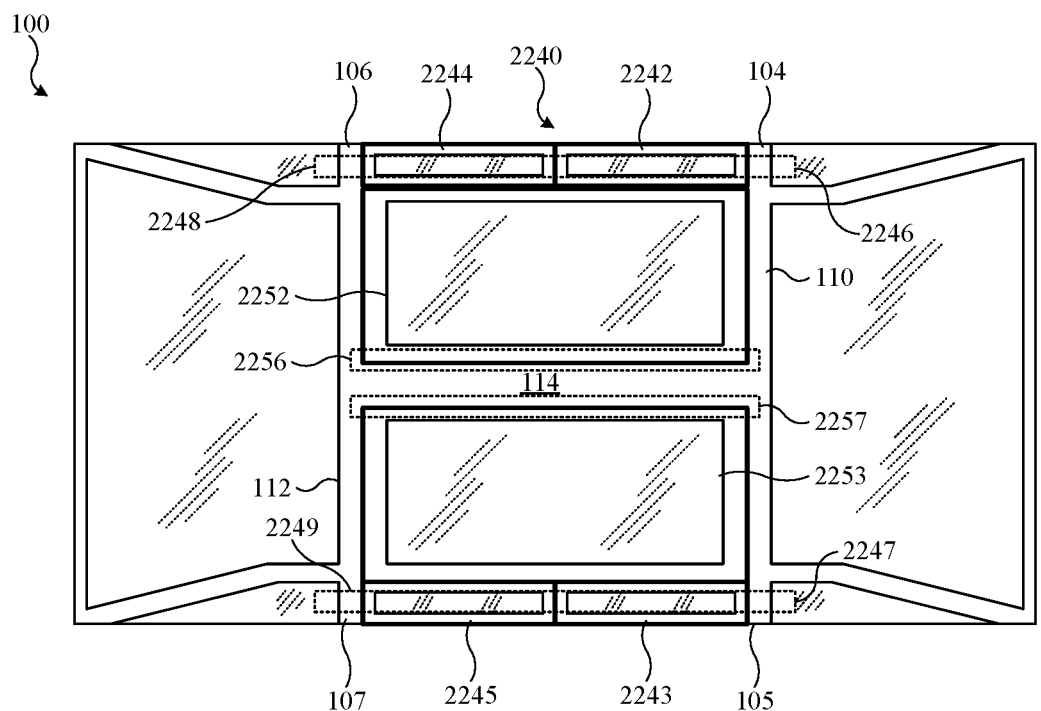
FIG. 22 is a top view of the vehicle body and a fourth example door and roof panel assembly in a closed position.
Figure 23:
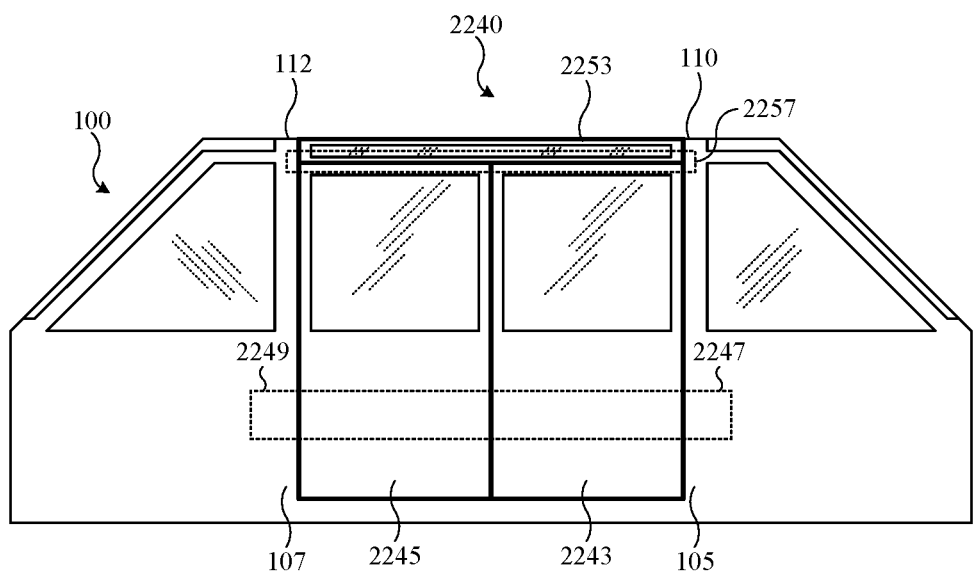
FIG. 23 is a side view of the vehicle body and the fourth example door and roof panel assembly in the closed position.
Figure 24:
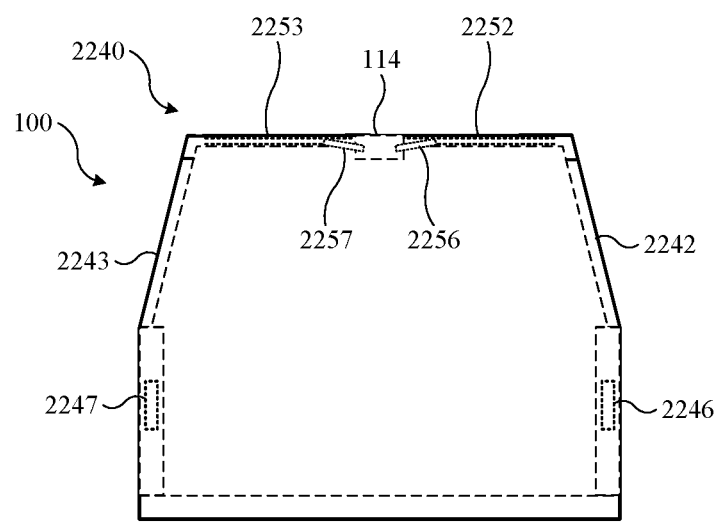
FIG. 24 is a front view of the vehicle body and the fourth example door and roof panel assembly in the closed position.
Figure 25:
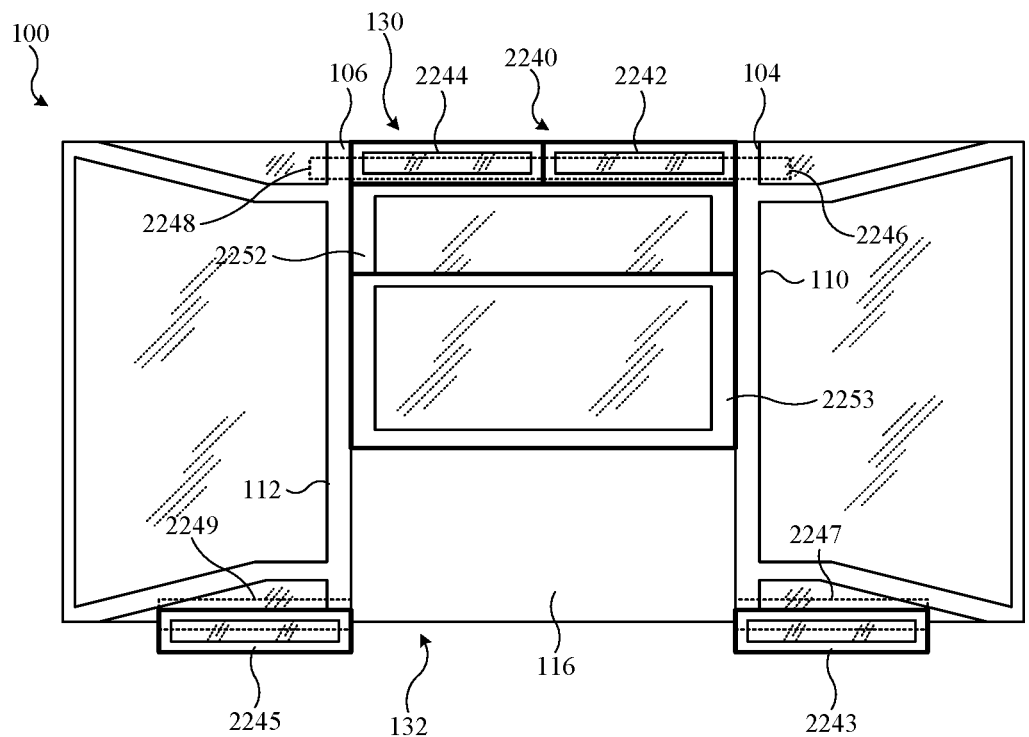
FIG. 25 is a top view of the vehicle body and a fourth example door and roof panel assembly with right-side door and roof panels of the door and roof panel assembly in an open position.
Figure 26:
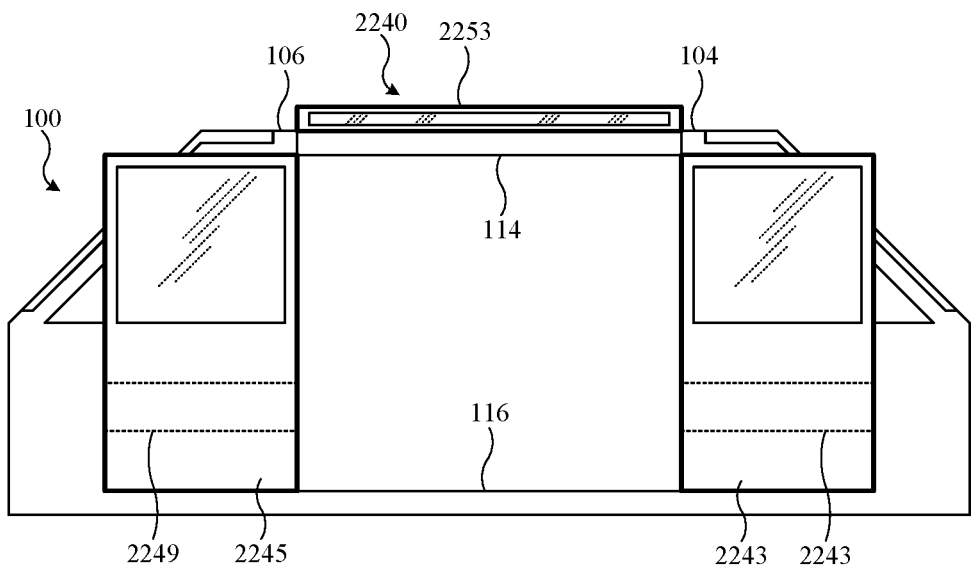
FIG. 26 is a side view of the vehicle body and the fourth example door and roof panel assembly with right-side door and roof panels of the door and roof panel assembly in an open position.
Figure 27:
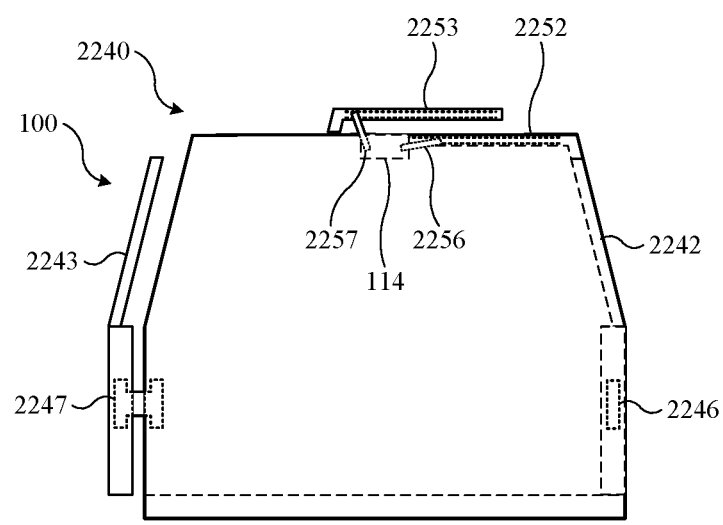
FIG. 27 is a front view of the vehicle body and the fourth example door and roof panel assembly with right-side door and roof panels of the door and roof panel assembly in an open position.

FIGS. 22-24 show the vehicle body 100 and a fourth example of a door and roof panel assembly 2240 in a closed position, including a top view of the vehicle body 100 and the roof panel assembly 2240 in FIG. 22, a side view of the vehicle body 100 and the roof panel assembly 2240 in FIG. 23, and a front view of the vehicle body 100 and the roof panel assembly 2240 in FIG. 24. FIGS. 25-27 show the vehicle body 100 and the door and roof panel assembly 2240 with right-side door and roof panels of the door and roof panel assembly 2240 in an open position, including a top view of the vehicle body 100 and the roof panel assembly 2240 in FIG. 25, a side view of the vehicle body 100 and the roof panel assembly 2240 in FIG. 26, and a front view of the vehicle body 100 and the roof panel assembly 2240 in FIG. 27.

The door and roof panel assembly 2240 includes four door panels and two roof panels. Pairs of the door panels cooperate with one of the roof panels to occupy part of the door area and part of the roof area in respective ones of the first opening 130 and the second opening 132. In the illustrated example, the door and roof panel assembly 2240 includes a front-left door panel 2242, a front-right door panel 2243, a rear-left door panel 2244, a rear-right door panel 2245, a left roof panel 2252, and right roof panel 2253.

The door panels 2242-2245 and the roof panels 2252-2253 are each movable between a closed position (FIGS.

22-24) and an open position (FIGS. 25-27). In the closed position, the door panels 2242-2245 and the roof panels 2252-2253 each occupy a portion of one of the first opening 130 or the second opening 132 and obstruct ingress or egress through that portion of the first opening 130 or the second opening 132. In the open position, each of the door panels 2242-2245 and each of the roof panels 2252-2253, respectively, are moved out of the first opening 130 or the second opening 132 to an extent that is sufficient to allow ingress or egress through that portion of the first opening 130 or the second opening 132. In the illustrated example, the front-right door panel 2243, the rear-right door panel 2245, and the right roof panel 2253 are shown in the open position in FIGS. 25-27, while the left-side panels are shown closed. It should be understood that the open position of the front-left door panel 2242, the rear-left door panel 2244, and the left roof panel 2252 is of an equivalent configuration that is similar to that shown for the right-side panels in FIGS. 25-27.

In the closed position, the front-left door panel 2242, the rear-left door panel 2244, and the left roof panel 2252 are located in first opening 130 such that they obstruct ingress or egress through part of the first opening 130. In particular, the front-left door panel 2242 is located in the first opening 130 adjacent to the front-left door pillar 104 and extends longitudinally toward the rear-left door pillar 106 to an intermediate location where it meets the rear-left door panel 2244. In the illustrated example, the vehicle body 100 lacks structural elements that are located between the front-left door and roof panel 2242 and the rear-left door and roof panel 2244, such that the front-left door and roof panel 2242 and the rear-left door and roof panel 2244 are in engagement with one another in the closed position. The rear-left door panel 2244 extends from the intermediate location to the rear-left door pillar 106. Lower ends of the front-left door panel 2242 and the rear-left door panel 2244 are adjacent to the floor 116 of the vehicle body 100 in the closed position, and upper ends of the front-left door panel 2242 and the rear-left door panel 2244 are adjacent to the left roof panel 2252. The left roof panel 2252 extends longitudinally from the front lateral beam 110 to the rear lateral beam 112 and extends laterally inward from the front-left door panel 2242 and the rear-left door panel 2244 to the central longitudinal beam 114 of the vehicle body 100 in the closed position.

To move from the closed position to the open position, the front-left door panel 2242 is connected to the vehicle body 100 by a front-left door slide assembly 2246, the rear-left door panel 2244 is connected to the vehicle body 100 by a rear-left door slide assembly 2248, and the left roof panel 2252 is connected to the vehicle body 100 by a left roof slide assembly 2256. As an example, the front-left door slide assembly 2246 and the rear-left door slide assembly 2248 could each include a rail that is located in a door area of a respective one the front-left door panel 2242 and the rear-left door panel 2244 and supported by a sliding carriage that is slidably connected to the rail and also connected to the vehicle body 100 by a support arm that is able to move the respective one of the front-left door panel 2242 and the rear-left door panel 2244 outward relative to the first opening 130. Actuators (e.g., electric, hydraulic, or pneumatic) may be included in the front-left door slide assembly 2246 and the rear-left door slide assembly 2248 in order to cause motion of the front-left door panel 2242 and the rear-left door panel 2244 between the closed and open positions. The left roof slide assembly 2256 includes a mechanism, such as a four bar linkage slidably connected to tracks on the left roof panel 2252, and actuators that connect the left roof panel 2252 to the central longitudinal beam 114 and/or to the front lateral beam 110 and the rear lateral beam 112 to lift the left roof panel 2252 upward relative to the vehicle body 100 and slide the left roof panel 2252 toward the right side of the vehicle body 100 such that a portion of the left roof panel 2252 is located above the right roof panel 2253 in the open position.

The front-left door panel 2242 may move from the closed position to the open position by first moving outward relative to the first opening 130 such that the front-left door panel 2242 is positioned outward from the vehicle body 100, and then sliding the front-left door panel 2242 longitudinally forward until the first opening 130 is sufficiently unobstructed so as to allow ingress and egress. The rear-left door panel 2244 may move from the closed position to the open position by first moving outward relative to the first opening 130 such that the rear-left door panel 2244 is positioned outward from the vehicle body 100, and then sliding the rear-left door panel 2244 longitudinally rearward and away from the front-left door panel 2242 until the first opening 130 is sufficiently unobstructed so as to allow ingress and egress. Thus, the front-left door panel 2242 and the rear-left door panel 2244 slide longitudinally away from each other during movement from the closed position to the open position. The left roof panel 2252 moves from the closed position to the open position by moving upward and then sliding rightward such that it moves toward the right side of the vehicle body 100 and is disposed above the right roof panel 2253.

In the closed position, the front-right door panel 2243, the rear-right door panel 2245, and the right roof panel 2253 are located in second opening 132 such that they obstruct ingress or egress through part of the second opening 132. In particular, the front-right door panel 2243 is located in the second opening 132 adjacent to the front-right door pillar 105 and extends longitudinally toward the rear-right door pillar 107 to an intermediate location where it meets the rear-right door panel 2245. The rear-right door panel 2245 extends from the intermediate location to the rear-right door pillar 107. Lower ends of the front-right door panel 2243 and the rear-right door panel 2245 are adjacent to the floor 116 of the vehicle body 100 in the closed position, and upper ends of the front-right door panel 2243 and the rear-right door panel 2245 are adjacent to the right roof panel 2253. The right roof panel 2253 extends longitudinally from the front lateral beam 110 to the rear lateral beam 112 and extends laterally inward from the front-right door panel 2243 and the rear-right door panel 2245 to the central longitudinal beam 114 of the vehicle body 100 in the closed position.

To move from the closed position to the open position, the front-right door panel 2243 is connected to the vehicle body 100 by a front-right door slide assembly 2247, the rear-right door panel 2245 is connected to the vehicle body 100 by a rear-right door slide assembly 2249, and the right roof panel 2253 is connected to the vehicle body 100 by a right roof slide assembly 2257. As an example, the front-right door slide assembly 2247 and the rear-right door slide assembly 2249 could each include a rail that is located in a door area of a respective one the front-right door panel 2243 and the rear-right door panel 2245 and supported by a sliding carriage that is slidably connected to the rail and also connected to the vehicle body 100 by a support arm that is able to move the respective one of the front-right door panel 2243 and the rear-right door panel 2245 outward relative to the second opening 132. Actuators (e.g., electric, hydraulic, or pneumatic) may be included in the front-right door slide assembly 2247 and the rear-right door slide assembly 2249 in order to cause motion of the front-right door panel 2243 and the rear-right door panel 2245 between the closed and open positions. The right roof slide assembly 2257 includes a mechanism, such as a four bar linkage slidably connected to tracks on the right roof panel 2253, and actuators that connect the right roof panel 2253 to the central longitudinal beam 114 and/or to the front lateral beam 110 and the rear lateral beam 112 to lift the right roof panel 2253 upward relative to the vehicle body 100 and slide the right roof panel 2253 toward the left side of the vehicle body 100 such that a portion of the right roof panel 2253 is located above the left roof panel 2252 in the open position.

The front-right door panel 2243 may move from the closed position to the open position by first moving outward relative to the second opening 132 such that the front-right door panel 2243 is positioned outward from the vehicle body 100, and then sliding the front-right door panel 2243 longitudinally forward until the second opening 132 is sufficiently unobstructed so as to allow ingress and egress. The rear-right door panel 2245 may move from the closed position to the open position by first moving outward relative to the second opening 132 such that the rear-right door panel 2245 is positioned outward from the vehicle body 100, and then sliding the rear-right door panel 2245 longitudinally rearward and away from the front-right door panel 2243 until the second opening 132 is sufficiently unobstructed so as to allow ingress and egress. Thus, the front-right door panel 2243 and the rear-right door panel 2245 slide longitudinally away from each other during movement from the closed position to the open position. The right roof panel 2253 moves from the closed position to the open position by moving upward and then sliding leftward such that it moves toward the left side of the vehicle body 100 and is disposed above the left roof panel 2252.

Figure 28:
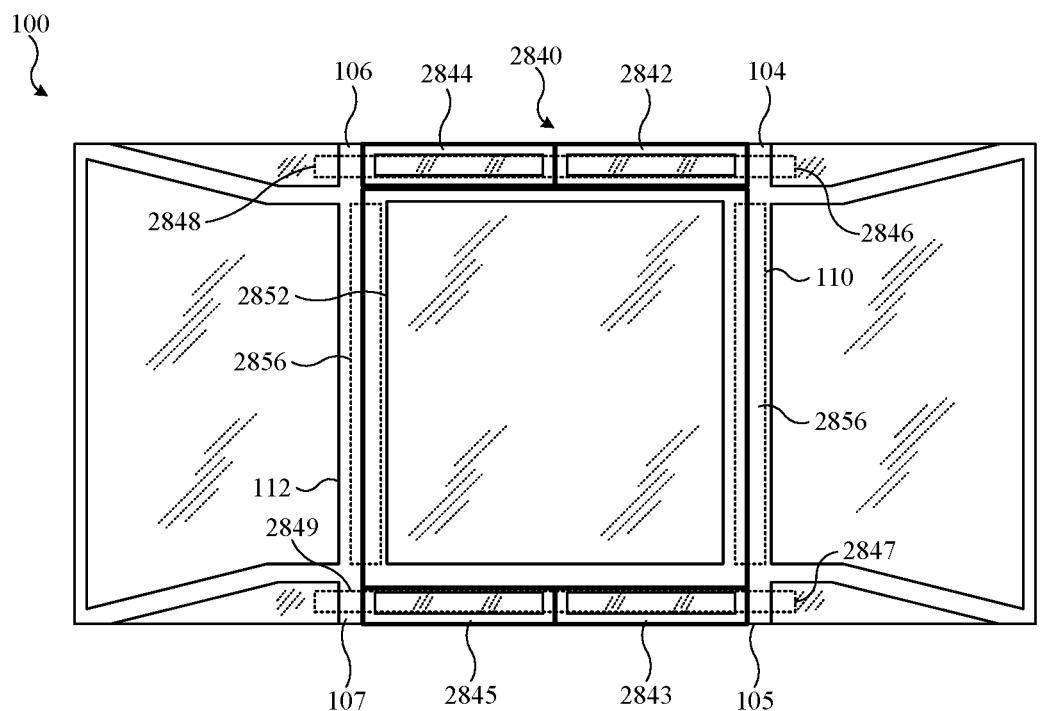
FIG. 28 is a top view of the vehicle body and a fifth example door and roof panel assembly in a closed position.
Figure 29:
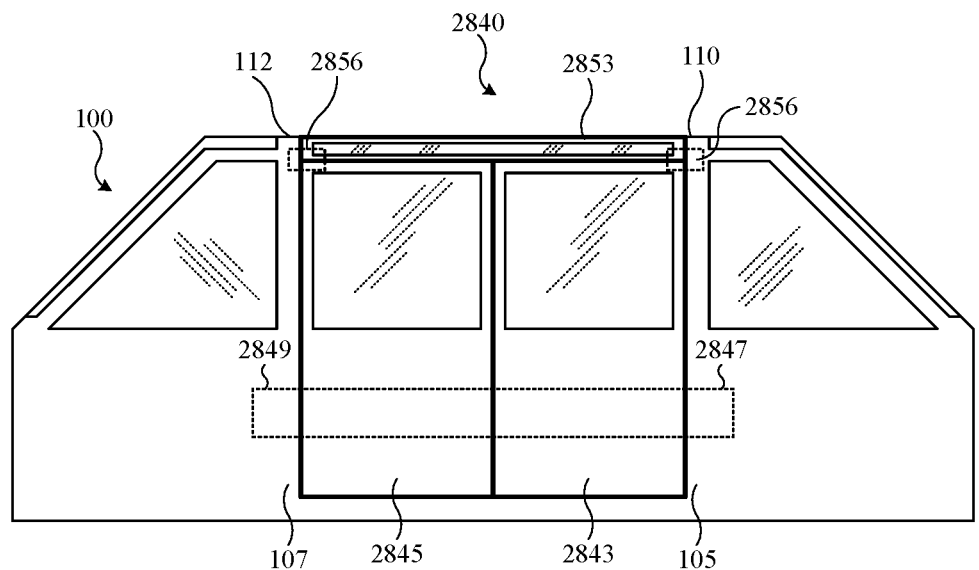
FIG. 29 is a side view of the vehicle body and the fifth example door and roof panel assembly in the closed position.
Figure 30:
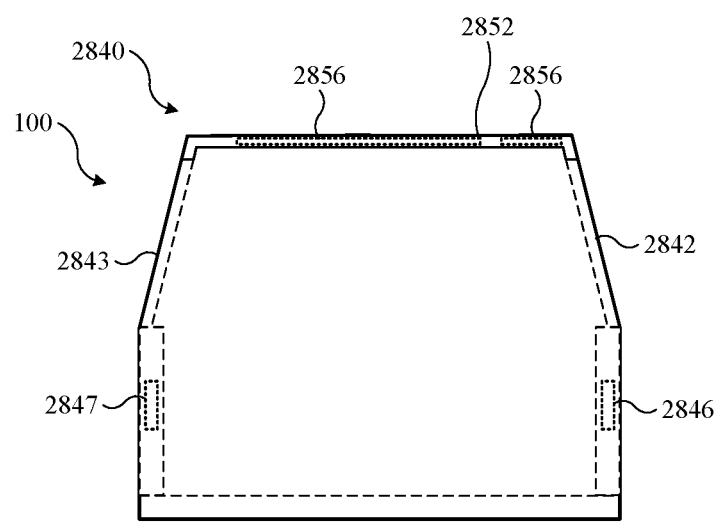
FIG. 30 is a front view of the vehicle body and the fifth example door and roof panel assembly in the closed position.
Figure 31:
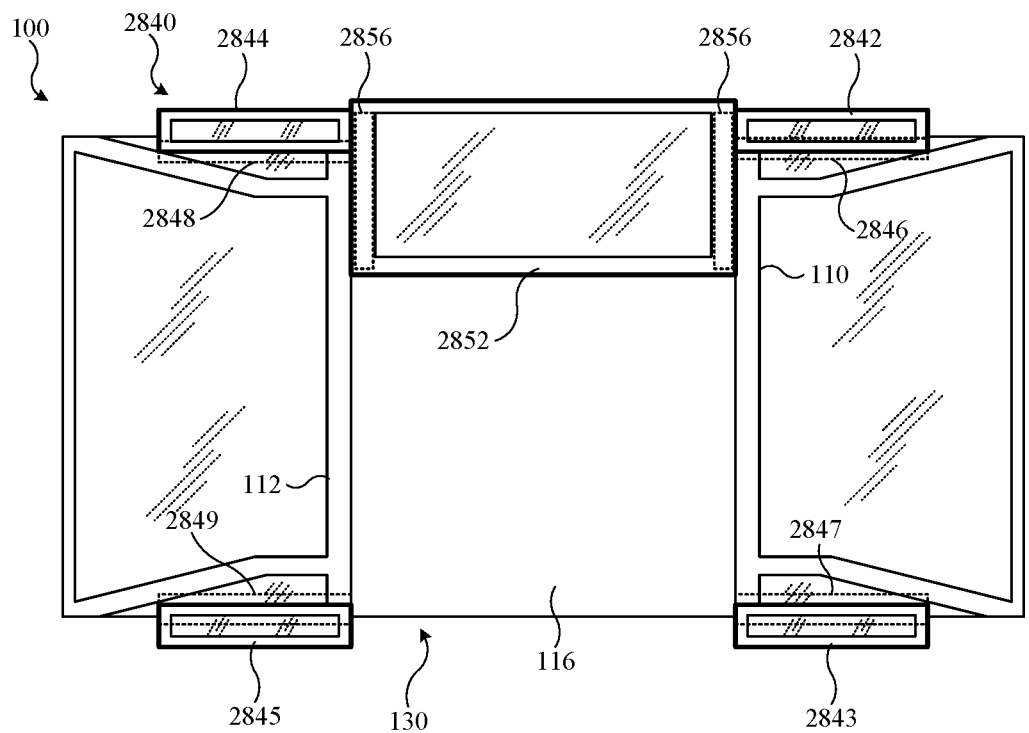
FIG. 31 is a top view of the vehicle body and a fifth example door and roof panel assembly with right-side door and roof panels of the door and roof panel assembly in an open position.
Figure 32:
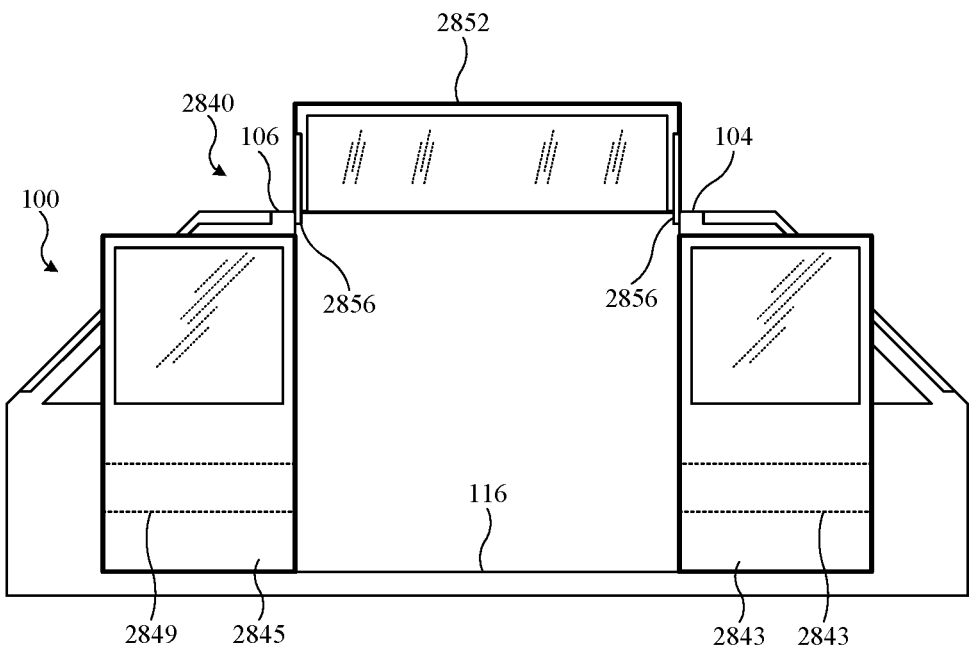
FIG. 32 is a side view of the vehicle body and the fifth example door and roof panel assembly with right-side door and roof panels of the door and roof panel assembly in an open position.
Figure 33:
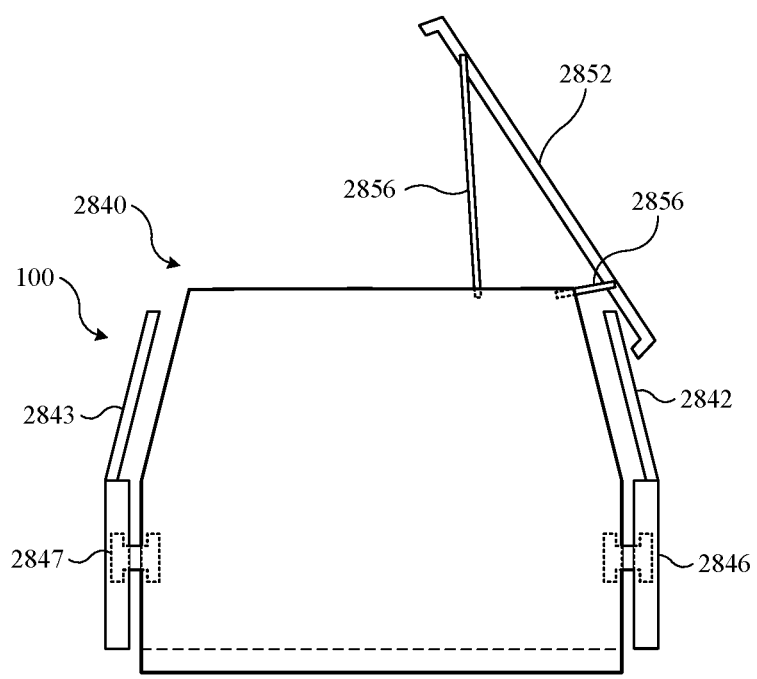
FIG. 33 is a front view of the vehicle body and the fifth example door and roof panel assembly with right-side door and roof panels of the door and roof panel assembly in an open position.

FIGS. 28-30 show the vehicle body 100 and a fifth example of a door and roof panel assembly 2840 in a closed position, including a top view of the vehicle body 100 and the roof panel assembly 2840 in FIG. 28, a side view of the vehicle body 100 and the roof panel assembly 2840 in FIG. 29, and a front view of the vehicle body 100 and the roof panel assembly 2840 in FIG. 30. FIGS. 31-33 show the vehicle body 100 and the door and roof panel assembly 2840 with right-side door and roof panels of the door and roof panel assembly 2840 in an open position, including a top view of the vehicle body 100 and the roof panel assembly 2840 in FIG. 31, a side view of the vehicle body 100 and the roof panel assembly 2840 in FIG. 32, and a front view of the vehicle body 100 and the roof panel assembly 2840 in FIG. 33.

The door and roof panel assembly 2840 includes four door panels and one roof panel. The vehicle body 100 may omit the central longitudinal beam 114 resulting in an opening 130 (i.e., a single opening, the second opening 132 is omitted) that extends laterally from the left side to the right side of the vehicle body 100. Alternatively, the central longitudinal beam could be positioned below the roof panel of the door and roof panel assembly 2840. The door panels cooperate with the roof panels to occupy part of the door area and part of the roof area in the opening 130. In the illustrated example, the door and roof panel assembly 2840 includes a front-left door panel 2842, a front-right door panel 2843, a rear-left door panel 2844, a rear-right door panel 2845, and a roof panel 2852.

The door panels 2842-2845 and the roof panel 2852 are each movable between a closed position (FIGS. 28-30) and an open position (FIGS. 31-33). In the closed position, the door panels 2842-2845 and the roof panel 2852 each occupy a portion of the opening 130 and obstruct ingress or egress through that portion the opening 130. In the open position, each of the door panels 2842-2845 and the roof panel 2852, respectively, are moved out of the opening 130 to an extent that is sufficient to allow ingress or egress through that portion of the opening 130.

In the closed position, the front-left door panel 2842 and the rear-left door panel 2844 are located in the opening 130 such that they obstruct ingress or egress through part of the opening 130. In particular, the front-left door panel 2842 is located in the opening 130 adjacent to the front-left door pillar 104 and extends longitudinally toward the rear-left door pillar 106 to an intermediate location where it meets the rear-left door panel 2844. In the illustrated example, the vehicle body 100 lacks structural elements that are located between the front-left door and roof panel 2842 and the rear-left door and roof panel 2844, such that the front-left door and roof panel 2842 and the rear-left door and roof panel 2844 are in engagement with one another in the closed position. The rear-left door panel 2844 extends from the intermediate location to the rear-left door pillar 106. Lower ends of the front-left door panel 2842 and the rear-left door panel 2844 are adjacent to the floor 116 of the vehicle body 100 in the closed position, and upper ends of the front-left door panel 2842 and the rear-left door panel 2844 are adjacent to the roof panel 2852.

To move from the closed position to the open position, the front-left door panel 2842 is connected to the vehicle body 100 by a front-left door slide assembly 2846, the rear-left door panel 2844 is connected to the vehicle body 100 by a rear-left door slide assembly 2848. As an example, the front-left door slide assembly 2846 and the rear-left door slide assembly 2848 could each include a rail that is located in a door area of a respective one the front-left door panel 2842 and the rear-left door panel 2844 and supported by a sliding carriage that is slidably connected to the rail and also connected to the vehicle body 100 by a support arm that is able to move the respective one of the front-left door panel 2842 and the rear-left door panel 2844 outward relative to the opening 130. Actuators (e.g., electric, hydraulic, or pneumatic) may be included in the front-left door slide assembly 2846 and the rear-left door slide assembly 2848 in order to cause motion of the front-left door panel 2842 and the rear-left door panel 2844 between the closed and open positions.

The front-left door panel 2842 may move from the closed position to the open position by first moving outward relative to the opening 130 such that the front-left door panel 2842 is positioned outward from the vehicle body 100, and then sliding the front-left door panel 2842 longitudinally forward until the opening 130 is sufficiently unobstructed so as to allow ingress and egress. The rear-left door panel 2844 may move from the closed position to the open position by first moving outward relative to the opening 130 such that the rear-left door panel 2844 is positioned outward from the vehicle body 100, and then sliding the rear-left door panel 2844 longitudinally rearward and away from the front-left door panel 2842 until the opening 130 is sufficiently unobstructed so as to allow ingress and egress. Thus, the front-left door panel 2842 and the rear-left door panel 2844 slide longitudinally away from each other during movement from the closed position to the open position.

In the closed position, the front-right door panel 2843 and the rear-right door panel 2845, are located in the opening 130 such that they obstruct ingress or egress through part of the opening 130. In particular, the front-right door panel 2843 is located in the opening 130 adjacent to the front-right door pillar 105 and extends longitudinally toward the rear-right door pillar 107 to an intermediate location where it meets the rear-right door panel 2845. The rear-right door panel 2845 extends from the intermediate location to the rear-right door pillar 107. Lower ends of the front-right door panel 2843 and the rear-right door panel 2845 are adjacent to the floor 116 of the vehicle body 100 in the closed position, and upper ends of the front-right door panel 2843 and the rear-right door panel 2845 are adjacent to the roof panel 2852.

To move from the closed position to the open position, the front-right door panel 2843 is connected to the vehicle body 100 by a front-right door slide assembly 2847, the rear-right door panel 2845 is connected to the vehicle body 100 by a rear-right door slide assembly 2849. As an example, the front-right door slide assembly 2847 and the rear-right door slide assembly 2849 could each include a rail that is located in a door area of a respective one the front-right door panel 2843 and the rear-right door panel 2845 and supported by a sliding carriage that is slidably connected to the rail and also connected to the vehicle body 100 by a support arm that is able to move the respective one of the front-right door panel 2843 and the rear-right door panel 2845 outward relative to the opening 130. Actuators (e.g., electric, hydraulic, or pneumatic) may be included in the front-right door slide assembly 2847 and the rear-right door slide assembly 2849 in order to cause motion of the front-right door panel 2843 and the rear-right door panel 2845 between the closed and open positions.

The front-right door panel 2843 may move from the closed position to the open position by first moving outward relative to the opening 130 such that the front-right door panel 2843 is positioned outward from the vehicle body 100, and then sliding the front-right door panel 2843 longitudinally forward until the opening 130 is sufficiently unobstructed so as to allow ingress and egress. The rear-right door panel 2845 may move from the closed position to the open position by first moving outward relative to the opening 130 such that the rear-right door panel 2845 is positioned outward from the vehicle body 100, and then sliding the rear-right door panel 2845 longitudinally rearward and away from the front-right door panel 2843 until the opening 130 is sufficiently unobstructed so as to allow ingress and egress. Thus, the front-right door panel 2843 and the rear-right door panel 2845 slide longitudinally away from each other during movement from the closed position to the open position.

In the closed position, the roof panel 2852 extends longitudinally from the front lateral beam 110 to the rear lateral beam 112. The roof panel 2853 also extends laterally from the front-left door panel 2842 and the rear-left door panel 2844 to the front-right door panel 2843 and the rear-right door panel 2845 in the closed position.

The roof panel 2852 is connected to the vehicle body 100 by a linkage assembly 2856. The linkage assembly 2856 may include four-bar linkages at the front and rear longitudinal ends of the roof panel 2852. As an example, the four-bar linkages could each include a pair of rigid bars that are pivotally and or slidably connected to the vehicle body 100 and the roof panel 2852. The linkage assembly 2856 also includes actuators (e.g., electric, hydraulic, or pneumatic) that are able to cause motion of the roof panel 2852 relative to the vehicle body 100 using the linkage assembly 2856. The roof panel 2852 may move from the closed position to the open position using the linkage assembly 2856 by moving upward and pivoting such that the roof panel 2853 moves laterally toward one side of the vehicle body 100 (toward the left side of the vehicle body 100 in the illustrated example) such that the opening 130 is no longer obstructed. The linkage assembly 2852 may be configured to open by pivoting such that the roof panel 2853 moves laterally to either the right side of the vehicle body 100 or the left side of the vehicle body 100 in dependence on which side of the vehicle body 100 passengers will be entering or exiting from.

Figure 34:
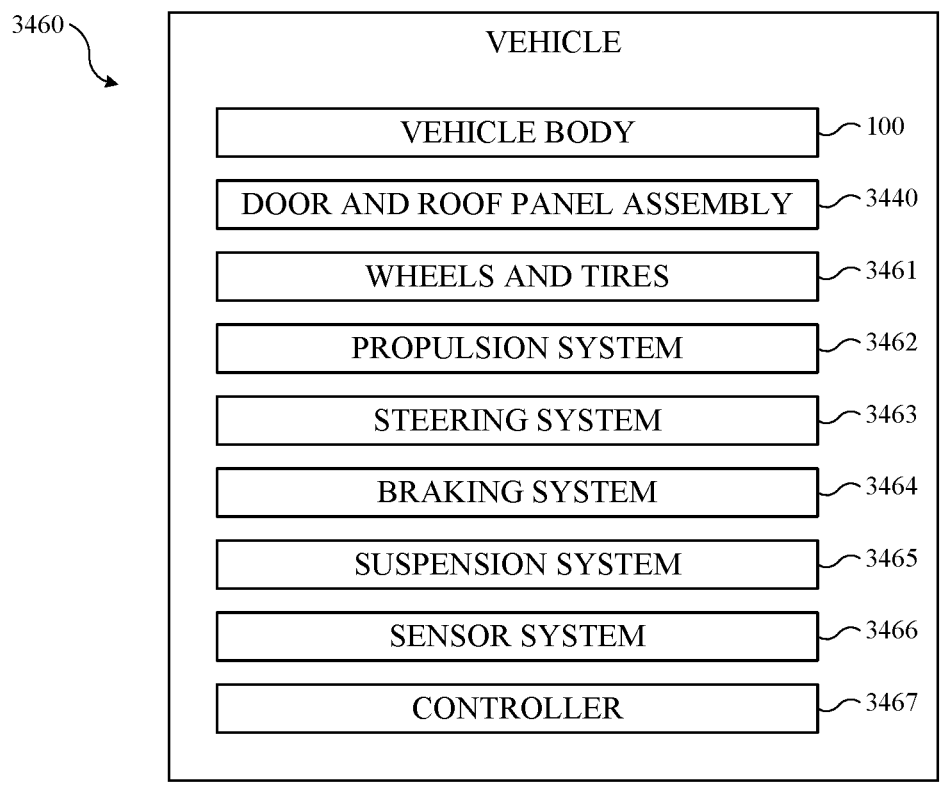
FIG. 34 is a block diagram that shows an example of a vehicle.

FIG. 34 is a block diagram that shows an example of a vehicle 2260 that includes the vehicle body 100, a door and roof panel assembly 3440, and other vehicle components and systems.

The door and roof panel assembly 3440 may be any of the door and roof panel assemblies described herein, such as the door and roof panel assembly 440, the door and roof panel assembly 1040, the door and roof panel assembly 1640, the door and roof panel assembly 2240, or the door and roof panel assembly 2840. The door and roof panel assembly 3440 may also incorporate features from two or more of these assemblies, such as by combining a single side door as in the door and roof panel assembly 1640 with a sliding roof panel as in the door and roof panel assembly 2240, or by incorporating a pivoting mechanism for moving the roof panels, as in the door and roof panel assembly 1040, with a sliding mechanism for moving the roof panels, as in the door and roof panel assembly 2240, into a single mechanism so that either pivoting or sliding motion can be selected.

The vehicle 3460 also includes conventional vehicle components, which in this example cooperate to define a road-going vehicle architecture that is intended for use on public streets. These components may include wheels and tires 3461, a propulsion system 3462, a steering system 3463, a braking system 3464, a suspension system 3465, a sensor system 3466, and a controller 3467. Other systems may be included in the vehicle 3460 in addition to those that are explicitly described herein.

The wheels and tires 3461 are conventional components such as pneumatic tires disposed on metal wheels. The wheels and tires 3461 are connected to the vehicle body by the suspension system 3465 and support the vehicle 3460 with respect to a surface such as a road surface. The propulsion system 3462 includes components that generate a driving force and transmit the driving force to propels the vehicle 3460, such as by application of torque to wheels and tires 3461. For example, the propulsion system 3462 may include one or more torque generating components, such as electric motors or an internal combustion engine, and this torque may be applied to any or all of the wheels and tires 3461.

The steering system 3463 includes steering actuators that are operable to change the direction of travel of the vehicle by changing the angle of one or more of the wheels and tires 3461 relative to the vehicle body 100. As examples, the steering system 3463 may include independent steering motors or rack-and-pinion devices. The braking system 3464 includes braking actuators that are operable to slow the vehicle, such as friction brakes and/or regenerative brakes (e.g., an electrical generator).

The suspension system 3465 includes components that regulate motion of a sprung mass of the vehicle 3460 (e.g., a vehicle body) relative to an unsprung mass of the vehicle 3460 (e.g., wheels, tires, hubs, braking components, etc.). The suspension system 3465 may include passive components (e.g., fixed damping rates and ride heights) and/or active components. The components of the suspension system 3465 may be operable to change damping rates, to change ride heights, and/or to apply a force between the sprung mass and the unsprung mass of the vehicle 3460. As an example, the suspension system 3465 may be configured to lower the vehicle body 100 when loading or unloading passengers to allow easier ingress or egress.

The sensor system 3466 includes one or more components that are able to make observations. Examples include visible or infrared spectrum cameras, LIDAR sensor systems, structured light sensor systems, and ultrasonic sensor systems.

The controller 3467 directs and controls operation of the vehicle 3460 and may allow operation in any of a manual control mode, a semi-autonomous control mode, or an autonomous control mode. The controller 3467 may determine operating parameters, settings, and/or commands for components of systems of the vehicle 3460 using sensor outputs that are provided to the controller 3467 from the sensor system 3466.

As described above, one aspect of the present technology is the gathering and use of data available from various sources for automated control of vehicle systems. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to control automated vehicle systems to pick up and drop off users at designated locations. Further, other uses for personal information data that benefit the user are also contemplated by the present disclosure. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, vehicle transport or delivery services, the present technology can be configured to allow users to select to "opt in" or "opt out" of participation in the collection of personal information data during registration for services or anytime thereafter. In another example, users can select not to provide personal information. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, transport services can be arranged using locations that are not personally associated with users, such as transit terminals, based on non-personal information data or a bare minimum amount of personal information, such as a designated destination.

What is claimed is:

1. A vehicle, comprising:
    a vehicle body that includes:
        a front-left door pillar,
        a front-right door pillar,
        a rear-left door pillar,
        a rear-right door pillar,
        a front lateral beam that extends from the front-left door pillar to the front-right door pillar,
        a rear lateral beam that extends from the rear-left door pillar to the rear-right door pillar,
        a central longitudinal beam that extends from the front lateral beam to the rear lateral beam,
        a floor,
        a first opening that is bounded by the front-left door pillar, the rear-left door pillar, the central longitudinal beam and the floor, and
        a second opening that is bounded by the front-right door pillar, the rear-right door pillar, the central longitudinal beam and the floor;
    a first panel assembly that is movable between a closed position and an open position with respect to the first opening;

a second panel assembly that is movable between a closed position and an open position with respect to the second opening;
a front seat that faces rearward and is accessible from the first opening and the second opening; and
a rear seat that faces forward and is accessible from the first opening and the second opening;
wherein the front lateral beam is longitudinally aligned with the front-left door pillar and the front-right door pillar and the rear lateral beam is longitudinally aligned with the rear-left door pillar and the rear-right door pillar.

2. The vehicle of claim 1, wherein:
the first panel assembly includes a front-left door and roof panel and a rear-left door and roof panel, and
the second panel assembly includes a front-right door and roof panel and a rear-right door and roof panel.

3. The vehicle of claim 2, wherein the front-left door and roof panel, the rear-left door and roof panel, the front-right door and roof panel, and the rear-right door and roof panel are connected to the vehicle body for sliding motion with respect to the vehicle body.

4. The vehicle of claim 3, wherein the front-left door and roof panel and the front-right door and roof panel slide longitudinally forward from the closed position to the open position, and the rear-left door and roof panel and the rear-right door and roof panel slide longitudinally rearward from the closed position to the open position.

5. The vehicle of claim 1, wherein:
the first panel assembly includes a front-left door panel, a rear-left door panel, and a left roof panel, and
the second panel assembly includes a front-right door panel, a rear-right door panel, and a right roof panel.

6. The vehicle of claim 5, wherein the left roof panel and the right roof panel are connected for pivotal motion with respect to the vehicle body between the closed position and the open position.

7. The vehicle of claim 5, wherein the left roof panel and the right roof panel are connected to the vehicle body for sliding motion in a lateral direction with respect to the vehicle body between the closed position and the open position.

8. The vehicle of claim 5, wherein the front-left door panel, the rear-left door panel, the front-right door panel, and the rear-right door panel are connected to the vehicle body for sliding motion with respect to the vehicle body between the closed position and the open position.

9. The vehicle of claim 8, wherein the front-left door panel and the front-right door panel slide longitudinally forward from the closed position to the open position, and the rear-left door panel and the rear-right door panel slide longitudinally rearward from the closed position to the open position.

10. The vehicle of claim 1, wherein:
the first panel assembly includes a left door panel and a left roof panel, and
the second panel assembly includes a right door panel and a right roof panel.

11. The vehicle of claim 10, wherein the left door panel extends from the front-left door pillar to the rear-left door pillar in the closed position, and the right door panel extends from the front-right door pillar to the rear-right door pillar in the closed position.

12. The vehicle of claim 10, wherein the left roof panel and the right roof panel are connected for pivotal motion with respect to the vehicle body between the closed position and the open position.

13. A vehicle, comprising:
a vehicle body that includes a first opening, a second opening, and a central longitudinal beam that is located between the first opening and the second opening;
a first panel assembly that is movable between a closed position and an open position with respect to the first opening, wherein the first panel assembly includes a left door panel and a left roof panel, and the left door panel slides longitudinally during movement from the closed position to the open position; and
a second panel assembly that is movable between a closed position and an open position with respect to the second opening, wherein the second panel assembly includes a right door panel and a right roof panel, and the right door panel slides longitudinally during movement from the closed position to the open position;
wherein a width of the left door panel is the same as a width of the left roof panel and a width of the right door panel is the same as a width of the right roof panel.

14. The vehicle of claim 13, wherein the left roof panel is pivotally connected to the vehicle body adjacent to the central longitudinal beam and pivots upward during movement from the closed position to the open position, and the right roof panel is pivotally connected to the vehicle body adjacent to the central longitudinal beam and pivots upward during movement from the closed position to the open position.

15. The vehicle of claim 13, wherein the vehicle body includes a front-left door pillar, a front-right door pillar, a rear-left door pillar, a rear-right door pillar, a front lateral beam that extends from the front-left door pillar to the front-right door pillar, a rear lateral beam that extends from the rear-left door pillar to the rear-right door pillar, and a floor, wherein the central longitudinal beam extends from the front lateral beam to the rear lateral beam.

16. A vehicle, comprising:
a vehicle body that includes a floor, a first opening, a second opening, and a central longitudinal beam that is located between the first opening and the second opening;
a first panel assembly that is movable between a closed position and an open position with respect to the first opening, wherein the first panel assembly includes a left door panel and a left roof panel; and
a second panel assembly that is movable between a closed position and an open position with respect to the second opening, wherein the second panel assembly includes a right door panel and a right roof panel,
wherein the left roof panel and the right roof panel are connected for pivotal motion with respect to the vehicle body between the closed position and the open position;
wherein a width of the first opening is the same as a width of the left door panel and a width of the left roof panel and a width of the second opening is the same as a width of the right door panel and a width of the right roof panel.

17. The vehicle of claim 16, wherein the vehicle body includes a front-left door pillar, a front-right door pillar, a rear-left door pillar, a rear-right door pillar, a front lateral beam that extends from the front-left door pillar to the front-right door pillar, and a rear lateral beam that extends from the rear-left door pillar to the rear-right door pillar, and wherein the central longitudinal beam extends from the front lateral beam to the rear lateral beam.

18. The vehicle of claim 17, further comprising:
a front seat that faces rearward and is accessible from the first opening and the second opening; and
a rear seat that faces forward and is accessible from the first opening and the second opening.

19. The vehicle of claim 5, wherein:
a combined width of the front-left door panel and the rear-left door panel is the same as a width of the left roof panel; and
a combined width of the front-right door panel and the rear-right door panel is the same as a width of the right roof panel.

20. The vehicle of claim 15, wherein the left door panel extends from the front-left door pillar to the rear-left door pillar in the closed position, and the right door panel extends from the front-right door pillar to the rear-right door pillar in the closed position.

* * * * *